US007753781B2

(12) United States Patent
Storch

(10) Patent No.: US 7,753,781 B2
(45) Date of Patent: Jul. 13, 2010

(54) SYSTEM FOR MACHINE READING AND PROCESSING INFORMATION FROM GAMING CHIPS

(75) Inventor: Leonard Storch, New York, NY (US)

(73) Assignee: CIAS, Inc., New York, NY (US)

( * ) Notice: Subject to any disclaimer, the term of this patent is extended or adjusted under 35 U.S.C. 154(b) by 0 days.

(21) Appl. No.: 11/929,413

(22) Filed: Oct. 30, 2007

(65) Prior Publication Data

US 2008/0045333 A1 Feb. 21, 2008

Related U.S. Application Data

(60) Continuation of application No. 11/530,286, filed on Sep. 8, 2006, now abandoned, which is a division of application No. 10/321,020, filed on Dec. 17, 2002, now Pat. No. 7,124,947, which is a division of application No. 09/335,100, filed on Jun. 17, 1999, now Pat. No. 6,514,140.

(51) Int. Cl.
*A63F 13/12* (2006.01)
*A63B 71/06* (2006.01)
*A63F 1/18* (2006.01)

(52) U.S. Cl. ............................ 463/25; 463/22; 463/42; 273/138.1; 273/139; 235/462.04; 235/462.06

(58) Field of Classification Search ............. 463/16–23, 463/25–29, 30–33, 36, 39–43, 45, 47; 273/138.1, 273/139, 138.2, 141 A, 454–456, 460; 270/52.02; 235/462.01–462.13; 713/1, 100, 150, 182, 713/187–189; 283/49, 903; 382/135–136, 382/138; *A63F 13/00, 13/12, 01/18; A63B 71/06*
See application file for complete search history.

(56) References Cited

U.S. PATENT DOCUMENTS 2,612,994 A 10/1952 Woodland et al.

(Continued)

FOREIGN PATENT DOCUMENTS

GB 2140948 12/1984

(Continued)

OTHER PUBLICATIONS

International Standard ISO/IEC 15417:2000(E), Information technology—Automatic identification and data capture techniques—Bar code symbology specification—Code 128, ISO/IEC 15417:2000(E) Jun. 1, 2000, Geneva, Switzerland.

(Continued)

*Primary Examiner*—Peter DungBa Vo
*Assistant Examiner*—Arthur O. Hall
(74) *Attorney, Agent, or Firm*—Frank J. DeRosa; Frommer Lawrence & Haug LLP

(57) ABSTRACT

A fully automatic table game player tracking system for Blackjack and other casino games wherein players have individual betting positions on the table is disclosed. An individual B&W CCD chip reading turret is placed inches in front of each player's betting position to scan wagered chips using ambient casino lighting. The turret also has a "comp" light to indicate to the player at the beginning of every hand that his bet was read credited for his complimentaries (meals, room, entertainment, etc.), thus delivering to the player extra gaming satisfaction every hand. Patterns of repeated coding around the playing chips' peripheral surface represent with light and dark contrasting colors the dollar value and particular casino issuer of the chips. The aesthetically pleasing chip identifying coding patterns are comprised of unique referenceless error controlled self-clocking (n,k) code words, which are repeated around the chip's periphery without space therebetween, for improved efficiency and accuracy no matter the orientation of the wagered chip placed on the table.

9 Claims, 19 Drawing Sheets

U.S. PATENT DOCUMENTS

| | | | | | |
|---|---|---|---|---|---|
| 3,541,310 | A | | 11/1970 | Stites | |
| 3,543,007 | A | | 11/1970 | Brinker et al. | |
| 3,552,142 | A | | 1/1971 | Schlichtig | |
| 3,622,758 | A | | 11/1971 | Schanne | |
| 3,671,722 | A | | 6/1972 | Christie | |
| 3,723,710 | A | | 3/1973 | Crouse et al. | |
| 3,784,792 | A | | 1/1974 | Dobras | |
| 3,792,236 | A | | 2/1974 | Dobras et al. | |
| 3,838,251 | A | | 9/1974 | Herrin | |
| 3,862,400 | A | | 1/1975 | Thomson | |
| 3,896,917 | A | | 7/1975 | Taplin | |
| 4,013,997 | A | | 3/1977 | Treadwell, III | |
| 4,024,511 | A | | 5/1977 | McJohnson | |
| 4,044,227 | A | | 8/1977 | Holm et al. | |
| 4,059,825 | A | | 11/1977 | Greene | |
| 4,096,378 | A | | 6/1978 | Vinal | |
| 4,191,970 | A | | 3/1980 | Witsenhausen et al. | |
| 4,282,426 | A | | 8/1981 | Neseem et al. | |
| 4,531,187 | A | * | 7/1985 | Uhland | 463/12 |
| 4,597,083 | A | | 6/1986 | Stenerson | |
| 4,644,143 | A | | 2/1987 | McJohnson et al. | |
| 4,660,221 | A | | 4/1987 | Dlugos | |
| 4,705,939 | A | | 11/1987 | Ulinski | |
| 4,755,941 | A | * | 7/1988 | Bacchi | 463/26 |
| 4,814,589 | A | * | 3/1989 | Storch et al. | 235/375 |
| 4,818,969 | A | | 4/1989 | Krakauer et al. | |
| 4,899,392 | A | | 2/1990 | Merton | |
| 5,103,081 | A | | 4/1992 | Fisher et al. | |
| 5,107,506 | A | | 4/1992 | Weng | |
| 5,110,134 | A | | 5/1992 | Laughlin et al. | |
| 5,123,352 | A | | 6/1992 | Luttrell | |
| RE34,003 | E | | 7/1992 | Weng | |
| 5,144,314 | A | | 9/1992 | Malmberg et al. | |
| 5,220,234 | A | | 6/1993 | Flory et al. | |
| 5,224,106 | A | | 6/1993 | Weng | |
| 5,235,618 | A | | 8/1993 | Sakai et al. | |
| 5,265,104 | A | | 11/1993 | Weng | |
| 5,283,422 | A | | 2/1994 | Storch et al. | |
| 5,290,033 | A | * | 3/1994 | Bittner et al. | 463/25 |
| 5,311,001 | A | | 5/1994 | Joseph et al. | |
| 5,337,361 | A | | 8/1994 | Wang et al. | |
| 5,369,260 | A | | 11/1994 | Schuessler | |
| 5,377,207 | A | | 12/1994 | Perlman | |
| 5,389,770 | A | | 2/1995 | Ackley | |
| 5,393,067 | A | | 2/1995 | Paulsen et al. | |
| 5,412,196 | A | | 5/1995 | Surka | |
| 5,414,251 | A | | 5/1995 | Durbin | |
| 5,429,361 | A | * | 7/1995 | Raven et al. | 463/25 |
| 5,430,283 | A | | 7/1995 | Tanaka | |
| 5,438,188 | A | | 8/1995 | Surka | |
| 5,440,142 | A | | 8/1995 | Maddox | |
| 5,471,533 | A | | 11/1995 | Wang et al. | |
| 5,489,767 | A | | 2/1996 | Billington | |
| 5,548,110 | A | | 8/1996 | Storch et al. | |
| 5,572,009 | A | | 11/1996 | Guertler | |
| 5,586,936 | A | * | 12/1996 | Bennett et al. | 463/25 |
| 5,605,334 | A | * | 2/1997 | McCrea, Jr. | 273/309 |
| 5,613,912 | A | * | 3/1997 | Slater | 463/25 |
| 5,619,027 | A | | 4/1997 | Ackley | |
| 5,651,548 | A | * | 7/1997 | French et al. | 463/25 |
| 5,675,137 | A | | 10/1997 | van Haagen et al. | |
| 5,707,287 | A | * | 1/1998 | McCrea, Jr. | 463/27 |
| 5,735,742 | A | * | 4/1998 | French | 463/25 |
| 5,745,510 | A | | 4/1998 | Choi | |
| 5,761,647 | A | * | 6/1998 | Boushy | 705/10 |
| 5,767,498 | A | | 6/1998 | Heske, III et al. | |
| 5,770,533 | A | | 6/1998 | Franchi | |
| 5,781,647 | A | * | 7/1998 | Fishbine et al. | 382/100 |
| 5,788,574 | A | * | 8/1998 | Ornstein et al. | 463/25 |
| 5,809,482 | A | * | 9/1998 | Strisower | 705/30 |
| 5,831,527 | A | * | 11/1998 | Jones et al. | 340/540 |
| 5,853,252 | A | | 12/1998 | Wright, IV et al. | |
| 5,889,270 | A | | 3/1999 | van Haagen et al. | |
| 5,919,090 | A | * | 7/1999 | Mothwurf | 463/25 |
| 5,941,769 | A | | 8/1999 | Order | |
| 5,957,776 | A | * | 9/1999 | Hoehne | 463/25 |
| 5,992,745 | A | | 11/1999 | Williams | |
| 6,003,013 | A | | 12/1999 | Boushy et al. | |
| 6,042,011 | A | | 3/2000 | Park et al. | |
| 6,047,892 | A | | 4/2000 | Schuessler et al. | |
| 6,141,441 | A | | 10/2000 | Cass et al. | |
| 6,165,069 | A | * | 12/2000 | Sines et al. | 463/12 |
| 6,186,895 | B1 | * | 2/2001 | Oliver | 463/25 |
| 6,200,218 | B1 | * | 3/2001 | Lindsay | 463/25 |
| 6,267,671 | B1 | * | 7/2001 | Hogan | 463/25 |
| 6,302,793 | B1 | * | 10/2001 | Fertitta et al. | 463/25 |
| 6,317,462 | B1 | | 11/2001 | Boyce | |
| 6,371,852 | B1 | * | 4/2002 | Acres | 463/25 |
| 6,374,382 | B1 | | 4/2002 | Solomon et al. | |
| 6,379,247 | B1 | * | 4/2002 | Walker et al. | 463/25 |
| 6,460,848 | B1 | * | 10/2002 | Soltys et al. | 273/149 R |
| 6,490,705 | B1 | | 12/2002 | Boyce | |
| 6,511,280 | B1 | | 1/2003 | Sammartino et al. | |
| 6,929,546 | B2 | * | 8/2005 | Moore et al. | 463/30 |
| 7,201,661 | B2 | * | 4/2007 | Kennedy et al. | 463/42 |

FOREIGN PATENT DOCUMENTS

| | | |
|---|---|---|
| WO | WO86/03605 | 6/1986 |
| WO | WO 96/07153 | 3/1996 |
| WO | WO 96/09100 | 3/1996 |
| WO | WO 97/10577 | 3/1997 |
| WO | WO 97/13227 | 4/1997 |

OTHER PUBLICATIONS

International Standard ISO/IEC 15420:2000(E), Information technology—Automatic identification and data capture techniques—Bar code symbology specification—EA/UPC, ISO/IEC 15417:2000(E) Dec. 15, 2000, Geneva, Switzerland.

* cited by examiner

| Casino Chip Codewords | Dark widths | Light widths | Binary | Dec. |
|---|---|---|---|---|
| | 1,1,1,3 | 7,1,1,1 | 0000 0001 0101 0111 | 00343 |
| | 1,1,2,2 | 7,1,1,1 | 0000 0001 0101 1011 | 00347 |
| | 1,1,3,1 | 7,1,1,1 | 0000 0001 0101 1101 | 00349 |
| | 1,2,1,2 | 7,1,1,1 | 0000 0001 0110 1011 | 00363 |
| | 1,2,2,1 | 7,1,1,1 | 0000 0001 0110 1101 | 00365 |
| | 2,1,1,2 | 7,1,1,1 | 0000 0001 1010 1011 | 00427 |
| | 1,1,1,3 | 6,2,1,1 | 0000 0010 0101 0111 | 00599 |
| | 1,1,2,2 | 6,2,1,1 | 0000 0010 0101 1011 | 00603 |
| | 1,1,3,1 | 6,2,1,1 | 0000 0010 0101 1101 | 00605 |
| | 1,2,1,2 | 6,2,1,1 | 0000 0010 0110 1011 | 00619 |
| | 1,2,2,1 | 6,2,1,1 | 0000 0010 0110 1101 | 00621 |
| | 1,3,1,1 | 6,2,1,1 | 0000 0010 0111 0101 | 00629 |
| | 1,1,1,3 | 6,1,2,1 | 0000 0010 1001 0111 | 00663 |
| | 1,1,2,2 | 6,1,2,1 | 0000 0010 1001 1011 | 00667 |
| | 1,1,3,1 | 6,1,2,1 | 0000 0010 1001 1101 | 00669 |
| | 1,1,1,3 | 6,1,1,2 | 0000 0010 1010 0111 | 00679 |
| | 1,1,2,2 | 6,1,1,2 | 0000 0010 1011 0011 | 00691 |
| | 1,2,1,2 | 6,1,2,1 | 0000 0010 1100 1011 | 00715 |
| | 1,2,2,1 | 6,1,2,1 | 0000 0010 1100 1101 | 00717 |
| | 1,2,1,2 | 6,1,1,2 | 0000 0010 1101 0011 | 00723 |
| | 2,1,1,2 | 6,2,1,1 | 0000 0011 0010 1011 | 00811 |
| | 2,1,1,2 | 6,1,2,1 | 0000 0011 0100 1011 | 00843 |
| | 1,1,1,3 | 5,3,1,1 | 0000 0100 0101 0111 | 01111 |
| | 1,1,2,2 | 5,3,1,1 | 0000 0100 0101 1011 | 01115 |
| | 1,1,3,1 | 5,3,1,1 | 0000 0100 0101 1101 | 01117 |
| | 1,2,1,2 | 5,3,1,1 | 0000 0100 0110 1011 | 01131 |
| | 1,2,2,1 | 5,3,1,1 | 0000 0100 0110 1101 | 01133 |
| | 1,3,1,1 | 5,3,1,1 | 0000 0100 0111 0101 | 01141 |
| | 1,1,1,3 | 5,2,2,1 | 0000 0100 1001 0111 | 01175 |
| | 1,1,2,2 | 5,2,2,1 | 0000 0100 1001 1011 | 01179 |
| | 1,1,3,1 | 5,2,2,1 | 0000 0100 1001 1101 | 01181 |
| | 1,1,1,3 | 5,2,1,2 | 0000 0100 1010 0111 | 01191 |
| | 1,1,2,2 | 5,2,1,2 | 0000 0100 1011 0011 | 01203 |
| | 1,1,3,1 | 5,2,1,2 | 0000 0100 1011 1001 | 01209 |
| | 1,2,1,2 | 5,2,2,1 | 0000 0100 1100 1011 | 01227 |
| | 1,2,2,1 | 5,2,2,1 | 0000 0100 1100 1101 | 01229 |
| | 1,2,1,2 | 5,2,1,2 | 0000 0100 1101 0011 | 01235 |
| | 1,2,2,1 | 5,2,1,2 | 0000 0100 1101 1001 | 01241 |
| | 1,3,1,1 | 5,2,2,1 | 0000 0100 1110 0101 | 01253 |
| | 1,1,1,3 | 5,1,3,1 | 0000 0101 0001 0111 | 01303 |
| | 1,1,2,2 | 5,1,3,1 | 0000 0101 0001 1011 | 01307 |
| | 1,1,3,1 | 5,1,3,1 | 0000 0101 0001 1101 | 01309 |
| | 1,1,1,3 | 5,1,2,2 | 0000 0101 0010 0111 | 01319 |
| | 1,1,2,2 | 5,1,2,2 | 0000 0101 0011 0011 | 01331 |
| | 1,1,1,3 | 5,1,1,3 | 0000 0101 0100 0111 | 01351 |
| | 1,1,2,2 | 5,1,1,3 | 0000 0101 0110 0011 | 01379 |
| | 1,2,1,2 | 5,1,3,1 | 0000 0101 1000 1011 | 01419 |
| | 1,2,2,1 | 5,1,3,1 | 0000 0101 1000 1101 | 01421 |
| | 1,2,1,2 | 5,1,2,2 | 0000 0101 1001 0011 | 01427 |
| | 1,2,1,2 | 5,1,1,3 | 0000 0101 1010 0011 | 01443 |
| | 2,1,1,2 | 5,3,1,1 | 0000 0110 0010 1011 | 01579 |
| | 2,1,1,2 | 5,2,2,1 | 0000 0110 0100 1011 | 01611 |
| | 2,1,1,2 | 5,2,1,2 | 0000 0110 0101 0011 | 01619 |
| | 2,1,1,2 | 5,1,3,1 | 0000 0110 1000 1011 | 01675 |
| | 1,1,1,3 | 4,4,1,1 | 0000 1000 0101 0111 | 02135* |
| | 1,1,2,2 | 4,4,1,1 | 0000 1000 0101 1011 | 02139 |
| | 1,1,3,1 | 4,4,1,1 | 0000 1000 0101 1101 | 02141* |
| | 1,2,1,2 | 4,4,1,1 | 0000 1000 0110 1011 | 02155 |
| | 1,1,1,3 | 4,3,2,1 | 0000 1000 1001 0111 | 02199 |

Fig. 4A

| Casino Chip Codewords | Dark widths | Light widths | Binary | Dec. |
|---|---|---|---|---|
| | 1,1,2,2 | 4,3,2,1 | 0000 1000 1001 1011 | 02203 |
| | 1,1,3,1 | 4,3,2,1 | 0000 1000 1001 1101 | 02205 |
| | 1,1,1,3 | 4,3,1,2 | 0000 1000 1010 0111 | 02215 |
| | 1,1,2,2 | 4,3,1,2 | 0000 1000 1011 0011 | 02227 |
| | 1,1,3,1 | 4,3,1,2 | 0000 1000 1011 1001 | 02233 |
| | 1,2,1,2 | 4,3,2,1 | 0000 1000 1100 1011 | 02251 |
| | 1,2,2,1 | 4,3,2,1 | 0000 1000 1100 1101 | 02253 |
| | 1,2,1,2 | 4,3,1,2 | 0000 1000 1101 0011 | 02259 |
| | 1,2,2,1 | 4,3,1,2 | 0000 1000 1101 1001 | 02265 |
| | 1,3,1,1 | 4,3,2,1 | 0000 1000 1110 0101 | 02277 |
| | 1,3,1,1 | 4,3,1,2 | 0000 1000 1110 1001 | 02281 |
| | 1,1,1,3 | 4,2,3,1 | 0000 1001 0001 0111 | 02327 |
| | 1,1,2,2 | 4,2,3,1 | 0000 1001 0001 1011 | 02331 |
| | 1,1,3,1 | 4,2,3,1 | 0000 1001 0001 1101 | 02333 |
| | 1,1,1,3 | 4,2,2,2 | 0000 1001 0010 0111 | 02343 |
| | 1,1,2,2 | 4,2,2,2 | 0000 1001 0011 0011 | 02355 |
| | 1,1,3,1 | 4,2,2,2 | 0000 1001 0011 1001 | 02361 |
| | 1,1,1,3 | 4,2,1,3 | 0000 1001 0100 0111 | 02375 |
| | 1,1,2,2 | 4,2,1,3 | 0000 1001 0110 0011 | 02403 |
| | 1,2,1,2 | 4,2,3,1 | 0000 1001 1000 1011 | 02443 |
| | 1,2,2,1 | 4,2,3,1 | 0000 1001 1000 1101 | 02445 |
| | 1,2,1,2 | 4,2,2,2 | 0000 1001 1001 0011 | 02451 |
| | 1,2,2,1 | 4,2,2,2 | 0000 1001 1001 1001 | 02457 |
| | 1,2,1,2 | 4,2,1,3 | 0000 1001 1010 0011 | 02467 |
| | 1,3,1,1 | 4,2,3,1 | 0000 1001 1100 0101 | 02501 |
| | 1,1,1,3 | 4,1,4,1 | 0000 1010 0001 0111 | 02583* |
| | 1,1,2,2 | 4,1,4,1 | 0000 1010 0001 1011 | 02587 |
| | 1,1,1,3 | 4,1,3,2 | 0000 1010 0010 0111 | 02599 |
| | 1,1,2,2 | 4,1,3,2 | 0000 1010 0011 0011 | 02611 |
| | 1,1,1,3 | 4,1,2,3 | 0000 1010 0100 0111 | 02631 |
| | 1,1,2,2 | 4,1,2,3 | 0000 1010 0110 0011 | 02659 |
| | 1,1,1,3 | 4,1,1,4 | 0000 1010 1000 0111 | 02695* |
| | 1,1,2,2 | 4,1,1,4 | 0000 1010 1100 0011 | 02755 |
| | 1,2,1,2 | 4,1,4,1 | 0000 1011 0000 1011 | 02827 |
| | 1,2,2,1 | 4,1,4,1 | 0000 1011 0000 1101 | 02829 |
| | 1,2,1,2 | 4,1,3,2 | 0000 1011 0001 0011 | 02835 |
| | 1,2,1,2 | 4,1,2,3 | 0000 1011 0010 0011 | 02851 |
| | 1,2,1,2 | 4,1,1,4 | 0000 1011 0100 0011 | 02883 |
| | 2,1,1,2 | 4,3,2,1 | 0000 1100 0100 1011 | 03147 |
| | 2,1,1,2 | 4,3,1,2 | 0000 1100 0101 0011 | 03155 |
| | 2,1,1,2 | 4,2,3,1 | 0000 1100 1000 1011 | 03211 |
| | 2,1,1,2 | 4,2,2,2 | 0000 1100 1001 0011 | 03219 |
| | 1,1,1,3 | 3,3,3,1 | 0001 0001 0001 0111 | 04375 |
| | 1,1,2,2 | 3,3,3,1 | 0001 0001 0001 1011 | 04379 |
| | 1,1,1,3 | 3,3,2,2 | 0001 0001 0010 0111 | 04391 |
| | 1,1,2,2 | 3,3,2,2 | 0001 0001 0011 0011 | 04403 |
| | 1,1,3,1 | 3,3,2,2 | 0001 0001 0011 1001 | 04409 |
| | 1,1,1,3 | 3,3,1,3 | 0001 0001 0100 0111 | 04423 |
| | 1,1,2,2 | 3,3,1,3 | 0001 0001 0110 0011 | 04451 |
| | 1,2,1,2 | 3,3,3,1 | 0001 0001 1000 1011 | 04491 |
| | 1,2,1,2 | 3,3,2,2 | 0001 0001 1001 0011 | 04499 |
| | 1,1,1,3 | 3,2,3,2 | 0001 0010 0010 0111 | 04647 |
| | 1,1,2,2 | 3,2,3,2 | 0001 0010 0011 0011 | 04659 |
| | 1,1,1,3 | 3,2,2,3 | 0001 0010 0100 0111 | 04679 |
| | 1,1,2,2 | 3,2,2,3 | 0001 0010 0110 0011 | 04707 |
| | 1,2,1,2 | 3,2,3,2 | 0001 0011 0001 0011 | 04883 |
| | 1,2,2,1 | 3,2,3,2 | 0001 0011 0001 1001 | 04889 |
| | 1,2,1,2 | 3,2,2,3 | 0001 0011 0010 0011 | 04899 |
| | 1,1,2,2 | 3,1,3,3 | 0001 0100 0110 0011 | 05219 |

Fig. 4B

| Casino Chip Codewords | Dark widths | Light widths | Binary | Dec. |
|---|---|---|---|---|
| | 1,1,1,7 | 3,1,1,1 | 0001 0101 0111 1111 | 05503 |
| | 1,1,2,6 | 3,1,1,1 | 0001 0101 1011 1111 | 05567 |
| | 1,1,3,5 | 3,1,1,1 | 0001 0101 1101 1111 | 05599 |
| | 1,1,4,4 | 3,1,1,1 | 0001 0101 1110 1111 | 05615* |
| | 1,1,5,3 | 3,1,1,1 | 0001 0101 1111 0111 | 05623 |
| | 1,1,6,2 | 3,1,1,1 | 0001 0101 1111 1011 | 05627 |
| | 1,1,7,1 | 3,1,1,1 | 0001 0101 1111 1101 | 05629 |
| | 1,2,1,6 | 3,1,1,1 | 0001 0110 1011 1111 | 05823 |
| | 1,2,2,5 | 3,1,1,1 | 0001 0110 1101 1111 | 05855 |
| | 1,2,3,4 | 3,1,1,1 | 0001 0110 1110 1111 | 05871 |
| | 1,2,4,3 | 3,1,1,1 | 0001 0110 1111 0111 | 05879 |
| | 1,2,5,2 | 3,1,1,1 | 0001 0110 1111 1011 | 05883 |
| | 1,2,6,1 | 3,1,1,1 | 0001 0110 1111 1101 | 05885 |
| | 1,3,1,5 | 3,1,1,1 | 0001 0111 0101 1111 | 05983 |
| | 1,3,2,4 | 3,1,1,1 | 0001 0111 0110 1111 | 05999 |
| | 1,3,3,3 | 3,1,1,1 | 0001 0111 0111 0111 | 06007 |
| | 1,3,4,2 | 3,1,1,1 | 0001 0111 0111 1011 | 06011 |
| | 1,3,5,1 | 3,1,1,1 | 0001 0111 0111 1101 | 06013 |
| | 1,4,1,4 | 3,1,1,1 | 0001 0111 1010 1111 | 06063* |
| | 1,4,2,3 | 3,1,1,1 | 0001 0111 1011 0111 | 06071 |
| | 1,4,3,2 | 3,1,1,1 | 0001 0111 1011 1011 | 06075 |
| | 1,4,4,1 | 3,1,1,1 | 0001 0111 1011 1101 | 06077* |
| | 1,5,1,3 | 3,1,1,1 | 0001 0111 1101 0111 | 06103 |
| | 1,5,2,2 | 3,1,1,1 | 0001 0111 1101 1011 | 06107 |
| | 1,6,1,2 | 3,1,1,1 | 0001 0111 1110 1011 | 06123 |
| | 2,1,1,6 | 3,1,1,1 | 0001 1010 1011 1111 | 06847 |
| | 2,1,2,5 | 3,1,1,1 | 0001 1010 1101 1111 | 06879 |
| | 2,1,3,4 | 3,1,1,1 | 0001 1010 1110 1111 | 06895 |
| | 2,1,4,3 | 3,1,1,1 | 0001 1010 1111 0111 | 06903 |
| | 2,1,5,2 | 3,1,1,1 | 0001 1010 1111 1011 | 06907 |
| | 2,2,1,5 | 3,1,1,1 | 0001 1011 0101 1111 | 07007 |
| | 2,2,2,4 | 3,1,1,1 | 0001 1011 0110 1111 | 07023 |
| | 2,2,3,3 | 3,1,1,1 | 0001 1011 0111 0111 | 07031 |
| | 2,2,4,2 | 3,1,1,1 | 0001 1011 0111 1011 | 07035 |
| | 2,3,1,4 | 3,1,1,1 | 0001 1011 1010 1111 | 07087 |
| | 2,3,2,3 | 3,1,1,1 | 0001 1011 1011 0111 | 07095 |
| | 2,3,3,2 | 3,1,1,1 | 0001 1011 1011 1011 | 07099 |
| | 2,4,1,3 | 3,1,1,1 | 0001 1011 1101 0111 | 07127 |
| | 3,1,1,5 | 3,1,1,1 | 0001 1101 0101 1111 | 07519 |
| | 3,1,2,4 | 3,1,1,1 | 0001 1101 0110 1111 | 07535 |
| | 3,1,3,3 | 3,1,1,1 | 0001 1101 0111 0111 | 07543 |
| | 3,2,1,4 | 3,1,1,1 | 0001 1101 1010 1111 | 07599 |
| | 3,2,2,3 | 3,1,1,1 | 0001 1101 1011 0111 | 07607 |
| | 4,1,1,4 | 3,1,1,1 | 0001 1110 1010 1111 | 07855* |
| | 1,1,1,7 | 2,2,1,1 | 0010 0101 0111 1111 | 09599 |
| | 1,1,2,6 | 2,2,1,1 | 0010 0101 1011 1111 | 09663 |
| | 1,1,3,5 | 2,2,1,1 | 0010 0101 1101 1111 | 09695 |
| | 1,1,4,4 | 2,2,1,1 | 0010 0101 1110 1111 | 09711 |
| | 1,1,5,3 | 2,2,1,1 | 0010 0101 1111 0111 | 09719 |
| | 1,1,6,2 | 2,2,1,1 | 0010 0101 1111 1011 | 09723 |
| | 1,1,7,1 | 2,2,1,1 | 0010 0101 1111 1101 | 09725 |
| | 1,2,1,6 | 2,2,1,1 | 0010 0110 1011 1111 | 09919 |
| | 1,2,2,5 | 2,2,1,1 | 0010 0110 1101 1111 | 09951 |
| | 1,2,3,4 | 2,2,1,1 | 0010 0110 1110 1111 | 09967 |
| | 1,2,4,3 | 2,2,1,1 | 0010 0110 1111 0111 | 09975 |
| | 1,2,5,2 | 2,2,1,1 | 0010 0110 1111 1011 | 09979 |
| | 1,3,1,5 | 2,2,1,1 | 0010 0111 0101 1111 | 10079 |
| | 1,3,2,4 | 2,2,1,1 | 0010 0111 0110 1111 | 10095 |
| | 1,3,3,3 | 2,2,1,1 | 0010 0111 0111 0111 | 10103 |

Fig. 4C

| Casino Chip Codewords | Dark widths | Light widths | Binary | Dec. |
|---|---|---|---|---|
| | 1,4,1,4 | 2,2,1,1 | 0010 0111 1010 1111 | 10159 |
| | 1,1,1,7 | 2,1,2,1 | 0010 1001 0111 1111 | 10623 |
| | 1,1,2,6 | 2,1,2,1 | 0010 1001 1011 1111 | 10687 |
| | 1,1,3,5 | 2,1,2,1 | 0010 1001 1101 1111 | 10719 |
| | 1,1,4,4 | 2,1,2,1 | 0010 1001 1110 1111 | 10735 |
| | 1,1,1,7 | 2,1,1,2 | 0010 1010 0111 1111 | 10879 |
| | 1,1,2,6 | 2,1,1,2 | 0010 1011 0011 1111 | 11071 |
| | 1,1,3,5 | 2,1,1,2 | 0010 1011 1001 1111 | 11167 |
| | 1,1,4,4 | 2,1,1,2 | 0010 1011 1100 1111 | 11215 |
| | 1,1,5,3 | 2,1,1,2 | 0010 1011 1110 0111 | 11239 |
| | 1,1,6,2 | 2,1,1,2 | 0010 1011 1111 0011 | 11251 |
| | 1,2,1,6 | 2,1,2,1 | 0010 1100 1011 1111 | 11455 |
| | 1,2,2,5 | 2,1,2,1 | 0010 1100 1101 1111 | 11487 |
| | 1,2,3,4 | 2,1,2,1 | 0010 1100 1110 1111 | 11503 |
| | 1,2,4,3 | 2,1,2,1 | 0010 1100 1111 0111 | 11511 |
| | 1,2,5,2 | 2,1,2,1 | 0010 1100 1111 1011 | 11515 |
| | 1,2,6,1 | 2,1,2,1 | 0010 1100 1111 1101 | 11517 |
| | 1,2,1,6 | 2,1,1,1 | 0010 1101 0011 1111 | 11583 |
| | 1,2,2,5 | 2,1,1,2 | 0010 1101 1001 1111 | 11679 |
| | 1,2,3,4 | 2,1,1,2 | 0010 1101 1100 1111 | 11727 |
| | 1,2,4,3 | 2,1,1,2 | 0010 1101 1110 0111 | 11751 |
| | 1,2,5,2 | 2,1,1,2 | 0010 1101 1111 0011 | 11763 |
| | 1,3,1,5 | 2,1,2,1 | 0010 1110 0101 1111 | 11871 |
| | 1,3,2,4 | 2,1,2,1 | 0010 1110 0110 1111 | 11887 |
| | 1,3,3,3 | 2,1,2,1 | 0010 1110 0111 0111 | 11895 |
| | 1,3,4,2 | 2,1,2,1 | 0010 1110 0111 1011 | 11899 |
| | 1,3,5,1 | 2,1,2,1 | 0010 1110 0111 1101 | 11901 |
| | 1,3,1,5 | 2,1,1,2 | 0010 1110 1001 1111 | 11935 |
| | 1,3,2,4 | 2,1,1,2 | 0010 1110 1100 1111 | 11983 |
| | 1,3,3,3 | 2,1,1,2 | 0010 1110 1110 0111 | 12007 |
| | 1,3,4,2 | 2,1,1,2 | 0010 1110 1111 0011 | 12019 |
| | 1,4,1,4 | 2,1,2,1 | 0010 1111 0010 1111 | 12079 |
| | 1,4,2,3 | 2,1,2,1 | 0010 1111 0011 0111 | 12087 |
| | 1,4,3,2 | 2,1,2,1 | 0010 1111 0011 1011 | 12091 |
| | 1,4,4,1 | 2,1,2,1 | 0010 1111 0011 1101 | 12093 |
| | 1,4,1,4 | 2,1,1,2 | 0010 1111 0100 1111 | 12111 |
| | 1,4,2,3 | 2,1,1,2 | 0010 1111 0110 0111 | 12135 |
| | 1,4,3,2 | 2,1,1,2 | 0010 1111 0111 0011 | 12147 |
| | 1,5,2,2 | 2,1,2,1 | 0010 1111 1001 1011 | 12187 |
| | 1,5,1,3 | 2,1,1,2 | 0010 1111 1010 0111 | 12199 |
| | 1,5,2,2 | 2,1,1,2 | 0010 1111 1011 0011 | 12211 |
| | 1,6,1,2 | 2,1,1,2 | 0010 1111 1101 0011 | 12243 |
| | 2,2,1,5 | 2,2,1,1 | 0011 0011 0101 1111 | 13151 |
| | 2,2,2,4 | 2,2,1,1 | 0011 0011 0110 1111 | 13167 |
| | 2,2,3,3 | 2,2,1,1 | 0011 0011 0111 0111 | 13175 |
| | 2,2,4,2 | 2,2,1,1 | 0011 0011 0111 1011 | 13179 |
| | 2,3,1,4 | 2,2,1,1 | 0011 0011 1010 1111 | 13231 |
| | 2,3,2,3 | 2,2,1,1 | 0011 0011 1011 0111 | 13239 |
| | 2,1,2,5 | 2,1,1,2 | 0011 0101 1001 1111 | 13727 |
| | 2,1,3,4 | 2,1,1,2 | 0011 0101 1100 1111 | 13775 |
| | 2,1,4,3 | 2,1,1,2 | 0011 0101 1110 0111 | 13799 |
| | 2,2,2,4 | 2,1,2,1 | 0011 0110 0110 1111 | 13935 |
| | 2,2,3,3 | 2,1,2,1 | 0011 0110 0111 0111 | 13943 |
| | 2,2,2,4 | 2,1,1,2 | 0011 0110 1100 1111 | 14031 |
| | 2,2,3,3 | 2,1,1,2 | 0011 0110 1110 0111 | 14055 |
| | 2,3,2,3 | 2,1,2,1 | 0011 0111 0011 0111 | 14135 |
| | 2,3,3,2 | 2,1,2,1 | 0011 0111 0011 1011 | 14139 |
| | 2,3,2,3 | 2,1,1,2 | 0011 0111 0110 0111 | 14183 |
| | 3,3,1,3 | 2,2,1,1 | 0011 1001 1101 0111 | 14807 |

Fig. 4D

| Casino Chip Codewords | Dark widths | Light widths | Binary | Dec. |
|---|---|---|---|---|
| | 1,1,1,3 | 4,4,1,1 | 0000 1000 0101 0111 | 02135* |
| | 1,1,3,1 | 4,4,1,1 | 0000 1000 0101 1101 | 02141* |
| | 1,1,1,3 | 4,1,4,1 | 0000 1010 0001 0111 | 02583* |
| | 1,1,1,3 | 4,1,1,4 | 0000 1010 1000 0111 | 02695* |
| | 1,1,4,4 | 3,1,1,1 | 0001 0101 1110 1111 | 05615* |
| | 1,4,1,4 | 3,1,1,1 | 0001 0111 1010 1111 | 06063* |
| | 1,4,4,1 | 3,1,1,1 | 0001 0111 1011 1101 | 06077* |
| | 4,1,1,4 | 3,1,1,1 | 0001 1110 1010 1111 | 07855* |

Fig. 4E

| Casino Chip Codewords | Dark widths | Light widths | Binary | Dec. |
|---|---|---|---|---|
| | 1,1,1,3 | 4,2,2,2 | 0000 1001 0010 0111 | 02343 |
| | 1,1,3,1 | 4,2,2,2 | 0000 1001 0011 1001 | 02361 |
| | 1,1,1,3 | 3,3,3,1 | 0001 0001 0001 0111 | 04375 |
| | 1,1,1,3 | 3,3,1,3 | 0001 0001 0100 0111 | 04423 |
| | 1,3,3,3 | 3,1,1,1 | 0001 0111 0111 0111 | 06007 |
| | 3,1,3,3 | 3,1,1,1 | 0001 1101 0111 0111 | 07543 |
| | 2,2,2,4 | 3,1,1,1 | 0001 1011 0110 1111 | 07023 |
| | 2,2,4,2 | 3,1,1,1 | 0001 1011 0111 1011 | 07035 |

Fig. 4F

| Casino Chip Codewords | Dark widths | Light widths | Binary | Dec. |
|---|---|---|---|---|
| | 1,1,1,3 | 7,1,1,1 | 0000 0001 0101 0111 | 00343 |
| | 1,1,3,1 | 7,1,1,1 | 0000 0001 0101 1101 | 00349 |
| | 1,1,1,3 | 5,3,1,1 | 0000 0100 0101 0111 | 01111 |
| | 1,1,3,1 | 5,3,1,1 | 0000 0100 0101 1101 | 01117 |
| | 1,1,1,7 | 3,1,1,1 | 0001 0101 0111 1111 | 05503 |
| | 1,1,3,5 | 3,1,1,1 | 0001 0101 1101 1111 | 05599 |
| | 1,1,5,3 | 3,1,1,1 | 0001 0101 1111 0111 | 05623 |
| | 1,1,7,1 | 3,1,1,1 | 0001 0101 1111 1101 | 05629 |

Fig. 4G

| Casino Chip Codewords | Dark widths | Light widths | Binary | Dec. |
|---|---|---|---|---|
| | 1,3,1,1 | 5,3,1,1 | 0000 0100 0111 0101 | 01141 |
| | 1,1,1,3 | 5,1,3,1 | 0000 0101 0001 0111 | 01303 |
| | 1,1,3,1 | 5,1,3,1 | 0000 0101 0001 1101 | 01309 |
| | 1,1,1,3 | 5,1,1,3 | 0000 0101 0100 0111 | 01351 |
| | 1,3,1,5 | 3,1,1,1 | 0001 0111 0101 1111 | 05983 |
| | 1,3,5,1 | 3,1,1,1 | 0001 0111 0111 1101 | 06013 |
| | 1,5,1,3 | 3,1,1,1 | 0001 0111 1101 0111 | 06103 |
| | 3,1,1,5 | 3,1,1,1 | 0001 1101 0101 1111 | 07519 |

Fig. 4H

SYSTEM FOR MACHINE READING AND PROCESSING INFORMATION FROM GAMING CHIPS

This is a continuation of application Ser. No. 11/530,286, filed Sep. 8, 2006 now abandoned, which is a division of application Ser. No. 10/321,020, filed Dec. 17, 2002 (Now U.S. Pat. No. 7,124,947), which is a division of application Ser. No. 09/335,100, filed Jun. 17, 1999 (Now U.S. Pat. No. 6,514,140).

BACKGROUND OF THE INVENTION

The invention disclosed herein relates generally to machine reading information from gaming chips, and more particularly to such machine reading during play of casino table games such as blackjack and baccarat. The invention has particular application to machine reading information from gaming chips for the purpose of ascertaining player betting, where the information read from the chips includes at least the denomination of the chips. That application allows a casino to rate players' betting activities in order to identify players that the casino wants to encourage to gamble in the casino, and to provide them with a commensurate level of free services, meals and merchandise such as accommodations, transportation, entertainment, food and beverages, known as "comping".

Comping is widely used by casinos to attract and hold gamblers. For example, Atlantic City and Nevada casinos comp players in the amount of hundreds of millions of dollars each year. However, even though casinos have attempted to track table player betting accurately, by pit bosses observations, a substantial portion of the comping inevitably goes to undeserving players while some deserving players go uncomped. In many cases today, ascertaining player betting for the purpose of comping is done manually by pit bosses. As described below, there has been movement in recent years towards automating information gathering and processing for the purpose of player comping. However, the prior art systems described below all have serious shortcomings and drawbacks which the invention disclosed herein avoids.

The "PitTrak Player Tracking System" as advertised by PRC Gaming Systems of Chico, Calif., is a player table game tracking system which receives player identification information on magnetic stripe cards read by readers mounted to the table, and betting information is entered by a pit boss using a touch screen mounted to the table.

U.S. Pat. No. 5,586,936 issued on Dec. 24, 1996 to Mikohn Gaming Corp. of Las Vegas, Nev., and U.S. Pat. No. 5,613,912 issued on Mar. 25, 1997 to Harrah's Club of Reno, Nev. disclose partially automated gaming table tracking systems which include magnetic stripe readers mounted to the table for entering player identification information on magnetic stripe cards. The system disclosed in U.S. Pat. No. 5,586,936 also includes a printer which prints player tracking cards having spaces for in which betting information can be entered manually by the pit boss, and a reader which reads the filled-in player cards.

Though both the "PitTrak Player Tracking System" and the system described in U.S. Pat. No. 5,586,936 machine read player identification information and facilitate entry of betting information, since they do not machine read information from the gambling chips but instead require a manual data entry step, they do not truly automate data collection for player comping.

International Patent Publication WO 9710577 of GRIPS Electronics GES, MBH dated Mar. 20, 1997 discloses an automated table monitoring system which includes readers mounted to the table for entering player information on cards, and employs sensors to detect chip presence for automated betting information data entry. Chip presence is detected by sensors mounted to the table at player betting locations and in a dealer chip rack, which in one embodiment may have a chip deposit area for each player. For use of the system with card games such as blackjack, a sensor is also provided for monitoring the status of the dealer's cards. By monitoring dealer card status and the flow of chips between the player betting locations and the dealer chip rack, winning and losing bets are automatically determined and entered into the system. However, the embodiment of the system described in this patent publication which does not include a chip deposit area for each player, does not provide for automatic entry of bet values for each bet. Instead, exact bet values are determined in blackjack only when a player busts or goes over, and these values are averaged and used as a basis for the bet value in other hands. In the embodiment which includes a dealer's chip rack with a chip deposit area for each player, exact bet values per player can only be entered if chips lost and won by a player are inserted and removed only from the chip deposit area assigned to that player. Thus, in one embodiment, exact bet information is not provided, and in the other, the dealer must be careful to associate chips won and lost by a player only with the specific deposit area of the chip rack assigned to that player, which precludes the dealer from mixing chips from losing bets to pay winning bets, as is typically done, and therefore substantially slows game play.

U.S. Pat. No. 4,531,187, issued to Joseph C. Uhland on Jul. 23, 1985, discloses a system for monitoring play at gambling tables which, in the case of a blackjack table, optically monitors the cards played and the chips bet. The Uhland patent states that the system is able to monitor plural tables, and that the overall results are sent to a central computing unit which generates reports and statistics of the day's play. As described in the Uhland patent, an ordinary video camera is mounted to the casino ceiling to look directly down upon the playing surface. According to the Uhland patent, the system identifies the chips bet based on color using the video camera, a scanner and certain generally described circuits. However, a system relying on a single ceiling-mounted camera to monitor all chip locations on a table below likely would not be able to determine how many chips (and their denomination) players bet because multiple chip bets are placed in vertical stacks and only the top chip can be seen.

U.S. Pat. No. 4,814,589 of Leonard Storch et al., issued on Mar. 31, 1989 and assigned to Cias Inc., the assignee of this application, discloses machine reading information (e.g., optically) from the periphery of gambling chips for many purposes, including player activity. This patent discloses fundamentals of automatic gaming chip reading and automatic management of many casino functions using machine read information. Additionally, this patent discloses machine reading chips bet by players using individual chip readers.

International Patent Publication WO 9607153 of John W. Strisower dated Mar. 7, 1996 (U.S. Pat. No. 5,809,482), like the Storch et al. patent, discloses readers which optically machine read information on the edges of a respective stack of gambling chips. However, other than a schematic association of the readers with a gaming table in a block diagram, there is no disclosure of what the readers are, or where or how they are mounted.

International Patent Publication No. WO 9713227 of Digital Biometrics, Inc. dated Apr. 10, 1997(U.S. Pat. No. 5,781,647) discloses a gambling chip recognition system which is described as having the ability to capture an image of a stack of gambling chips and automatically process the image to determine the number of chips in the stack and the value of each. As described in this publication, the system includes a conventional video camera for each gambling position on the gambling table. According to an article in Casino World, September, 1996, pages 42-44, a system known as "Trak 21", which is advertised by Digital Biometrics, Inc. and is believed to be related to the system described in International Publication WO 97/13227, the cameras are "positioned on the side of the dealer". As a result, the cameras are still located a distance from the chips, and face in the direction of the players.

Mikohn Gaming Corporation of Las Vegas, Nev. offered a system called "SafeJack" for player tracking and comping. According to a Mikohn advertisement, the SafeJack system employs special gaming chips that each carry an embedded computer microchip. According to an advertisement of the gaming chip manufacturer, Bourgogne et Grasset of Beaune, France, the computer microchip is an ASIC integrated circuit linked to a small coil, which receives energy and interrogation signals through electromagnetic waves emitted from an outside reader device and transmits data back to the reading device. The SafeJack system is advertised to read and display all bets and payouts, and to include a light at each player position to indicate a win, push or loss. Because the SafeJack system requires special gaming chips that each include an integrated circuit, and electronics which transmit, receive and process electromagnetic energy, the SafeJack system is relatively complex and its overall cost is high and it involves exposure to rf energy.

Despite the previous disclosures and systems described above, there remains a need for automatically obtaining information from gaming chips during casino-style game play reliably, non-intrusively, and with little or no interference in or slowing of game play, for player comping and for other purposes. There is a concurrent need to provide a system to do so which is simple and inexpensive, and preferably which also enhances play for players. The invention disclosed herein fulfills these needs.

OBJECTS AND SUMMARY OF THE INVENTION

It is an object of the invention disclosed herein to automatically obtain, i.e., machine read, information from gambling chips reliably during play on gambling tables.

It is another object to obtain such information unobtrusively, with little or no interference in game play, and/or with little or no slowing of game play.

It is another object of the invention to fully automate information collection from gambling tables, particularly for card games and particularly for the purpose of comping players.

It is another object of the invention to automatically obtain information from gambling tables, and to provide a system to do so, as described in the foregoing objects, for player comping and for other purposes.

It is another object of the invention to enhance casino-style game play while providing for automatic reading of information from gaming chips during game play for the purpose of determining player comps.

It is another object of the invention to provide a system which accomplishes one or more of the foregoing objects which is simple to manufacture and operate and which is inexpensive to manufacture.

It is an object of the invention to provide an improved bar code for use on the periphery of gaming chips and for other applications.

The invention disclosed herein accomplishes the above and other objects as described herein. The invention provides for automatically obtaining, i.e., machine reading, optical information from the periphery of single or stacked gaming chips placed in betting locations on a gaming table during play using small optical devices unobtrusively mounted to the table to at least collect the optical information from the peripheries of the chips. The chips need not be placed in racks, and the optical devices are independent of any chip rack. Respective optical devices are positioned spaced from but close to respective chip betting locations on respective tables to more reliably receive the optical information from the peripheries of the chips. In the preferred embodiment, an optical device does not face in the direction of the respective player whose chips for which that optical device is collecting optical information, and for a table having players stations on only one side, the cameras all face away from the side on which the players are stationed.

The invention also provides for automatic determination of winning and losing bets made with gaming chips on a gambling table. In the preferred embodiment, this is achieved by one or more sensors which sense the direction of movement of gaming chips on a gambling table when winning bets are paid and/or losing bets are collected.

The invention further provides for the automatic detection of one or more points in the cycle of a card game at a gambling table, for example the start and/or end of a card game relative to placing and/or paying bets and/or relative to dealing and/or placement of cards. In the preferred embodiment, this is achieved by one or more sensors which sense card movement or placement on the gambling table, and/or placement and/or movement of gaming chips on the gambling table.

The invention still further provides for the automation of the collection of gambling information at a gambling table needed for comping. This is achieved by combining automatic collection of information represented optically from the periphery of single or stacked gaming chips, automatic detection of one or more points in the cycle of a card game and automatic identification of players playing at a gambling table to determine amounts bet by each identified player per game. Additionally, winning and losing bets can be automatically determined for comping and other purposes.

In order to improve reliability and performance, the invention provides sets of unique n,k self-clocking bar code words which do not require start/stop patterns or quiet zones, and when repeated about the periphery of a gambling chip can be read in any rotated position of the chip about its axis relative to a reader.

Applicant's have invented a casino table game data capture application called Chip Reading System™, Crs™, which lends itself to casino card games such as blackjack and baccarat and other games played on similar tables wherein each player has an assigned location to place bets.

By automatically tracking the playing chips with applicant's periphery bar codes, CRS can also track players' activities and employees' activities involving these playing chips as well. Thus, CRS may be used to allow a casino to automatically manage its table game assets and to allow players to earn Automatic CompCredit™.

BRIEF DESCRIPTION OF THE DRAWINGS

The invention is illustrated by way of example and not limitation in the figures of the accompanying drawings in which like references indicate like parts, and in which:

FIGS. 4A to 4D represent 236 code words, shown in different ways, for casino chips.

FIGS. 4E to 4H show four sets of eight casino chip code words selected from the 236 code words shown in FIGS. 4A to 4D.

DETAILED DESCRIPTION

Typical Blackjack Table Components

Figure 6:
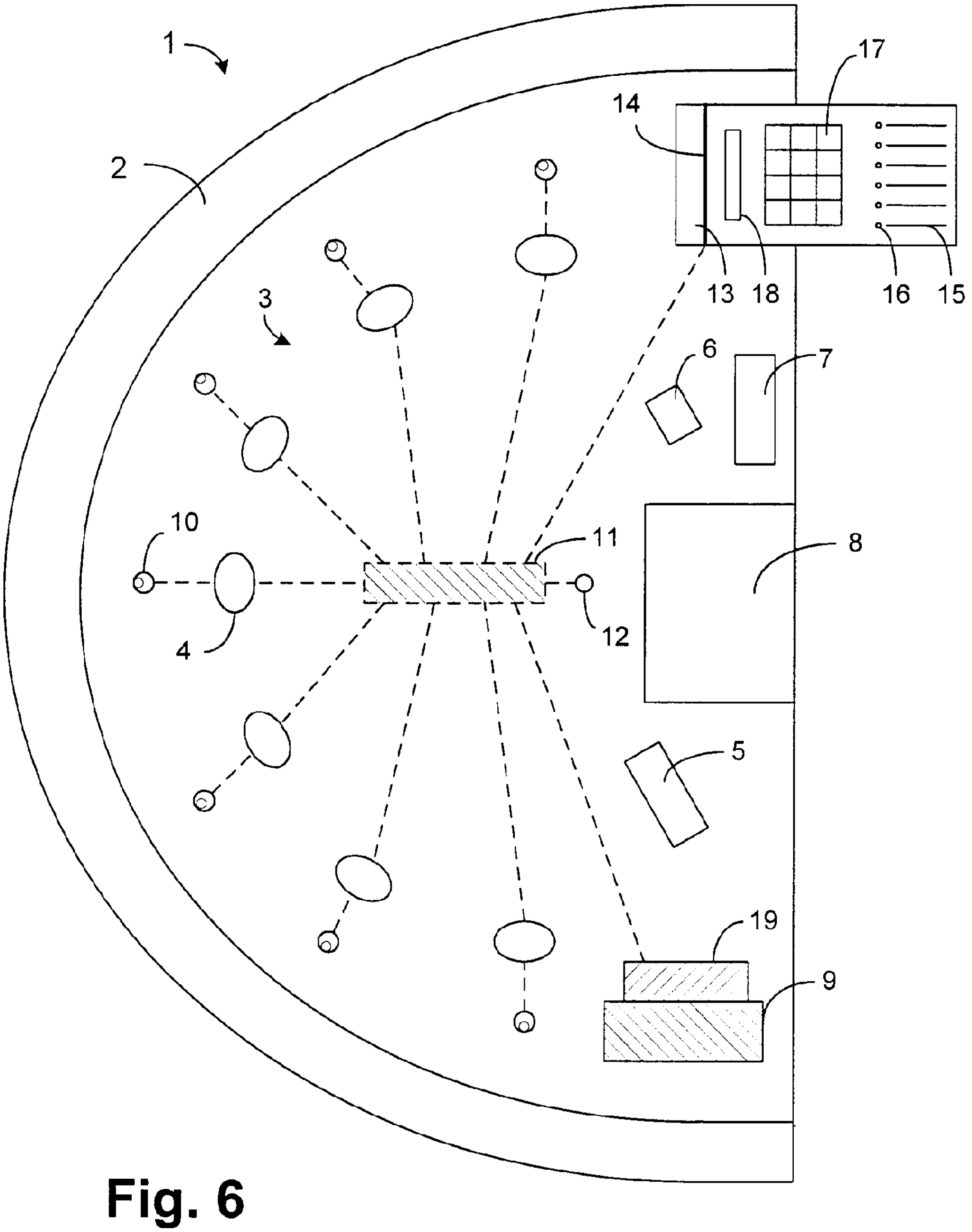
FIG. 6 is a diagram of a Blackjack table with CRS installed.
Figure 7:
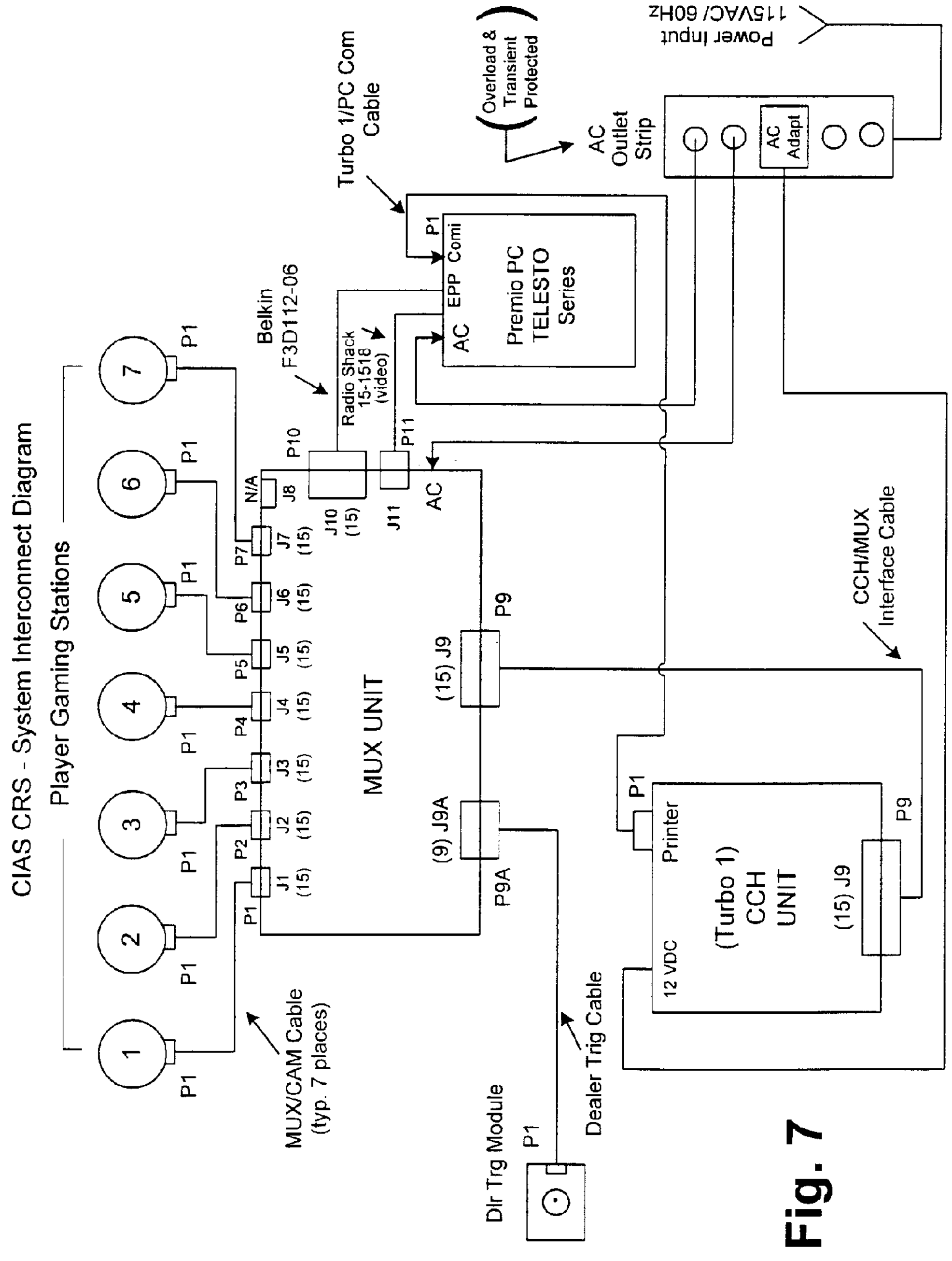
FIG. 7 is a system interconnect block diagram of the CRS.

Referring to FIG. 6, a blackjack table 1 is shown. In addition to typical blackjack table components, CRS components are also shown. Typical components shown in FIG. 6 include an elbow rail 2, a felt covered table top 3, one betting position 4 for each of seven players, a card shoe 5 from which playing cards are dealt, a receptacle 6 for used playing cards, a money plunger 7 in a slot over a cash box mounted under the table, a dealers chip rack 8 to hold the casino playing chips, and one support leg 9 of the blackjack table.

CRS Blackjack Table Components

CRS components shown in FIG. 6 include one Comp Light & Chip Reader Turret 10 for each player's betting position, a CRS Multiplex Board 11 mounted on the underside of the table top, one dealer card sensor 12, a CRS Table Comp Card Reader Terminal 13 with a magnetic card swipe slot 14, an associated Comp Card Holder with seven comp card slots 15 and seven LEDs 16, a keypad 17 for auxiliary information entry, and a two line display 18, and a CRS Table Computer 19 mounted to the table leg 9. These components and their functions are described below.

In a preferred embodiment, a custom molded player Comp Card Holder is associated with each table terminal 13. The comp card holder has seven slot positions 15 to hold seven comp cards that correspond to the seven blackjack player positions (more or less positions may be accommodated). And each comp card position 15 in the holder has an associated LED light 16 to indicate whether or not there is a comp card occupying that position. Players are identified by their personal casino issued comp club card, as described below. Or individual comp card readers could be installed in the table top or installed in the elbow rail 2 for each player position, as has been done for slot machine players for many years.

A custom molded Comp Light & Chip Reader Turret 10 is mounted on the blackjack table about three inches in front of each players betting position. Without human intervention of any sort, the chip reader 10 automatically reads every bet a player makes using a built in CCD or Laser device as described below. Or the reading device, such as a CCD device, could be mounted below the table felt in front of each player's betting position 4 pointing up toward the ceiling, and a prism or other mirror apparatus or a periscope (not shown) could be mounted over the reading device and used to reflect the image down into the reading device.

Figure 3:
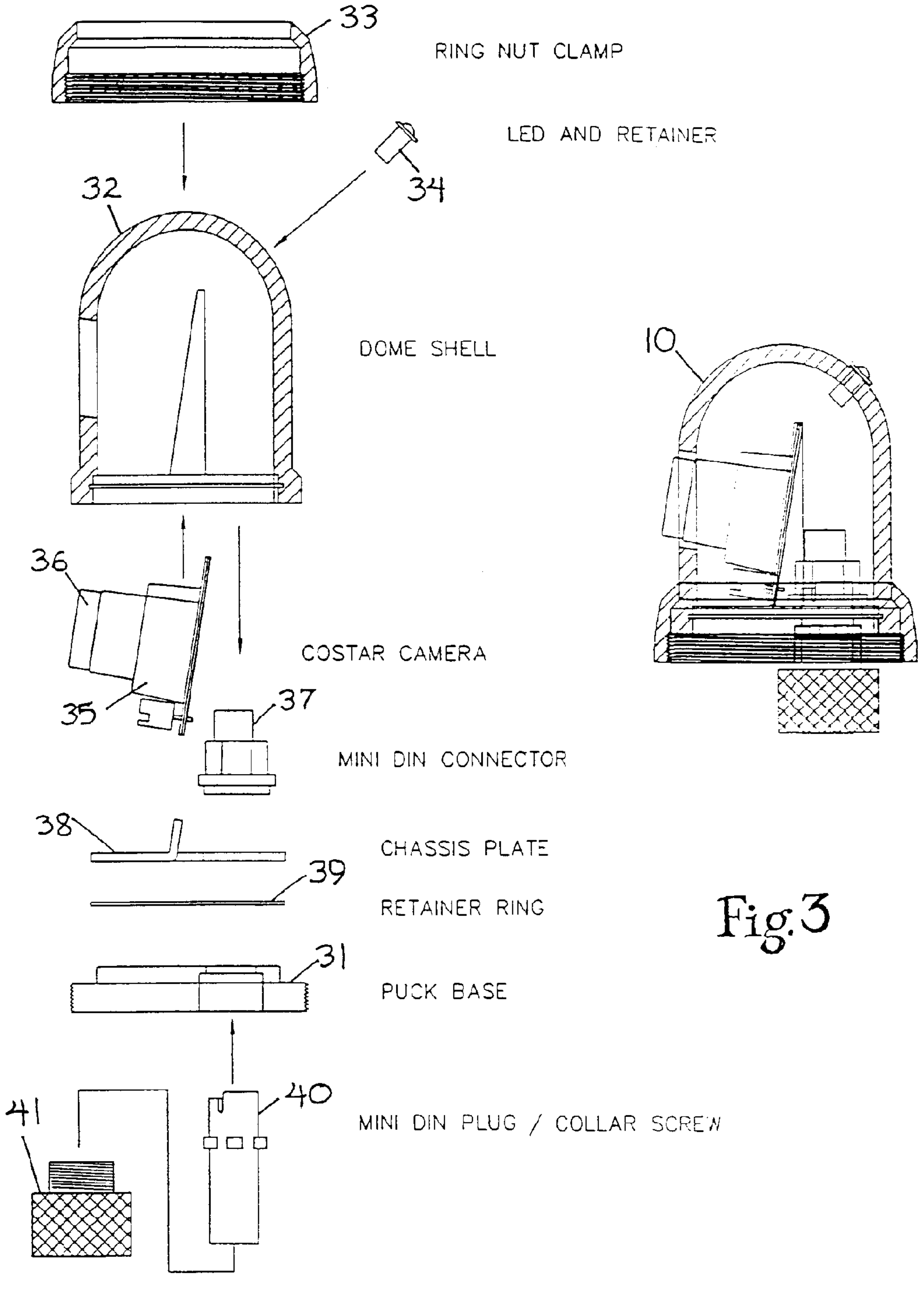
FIG. 3 represents the turret and its puck mounting arrangement.
Figure 3A:
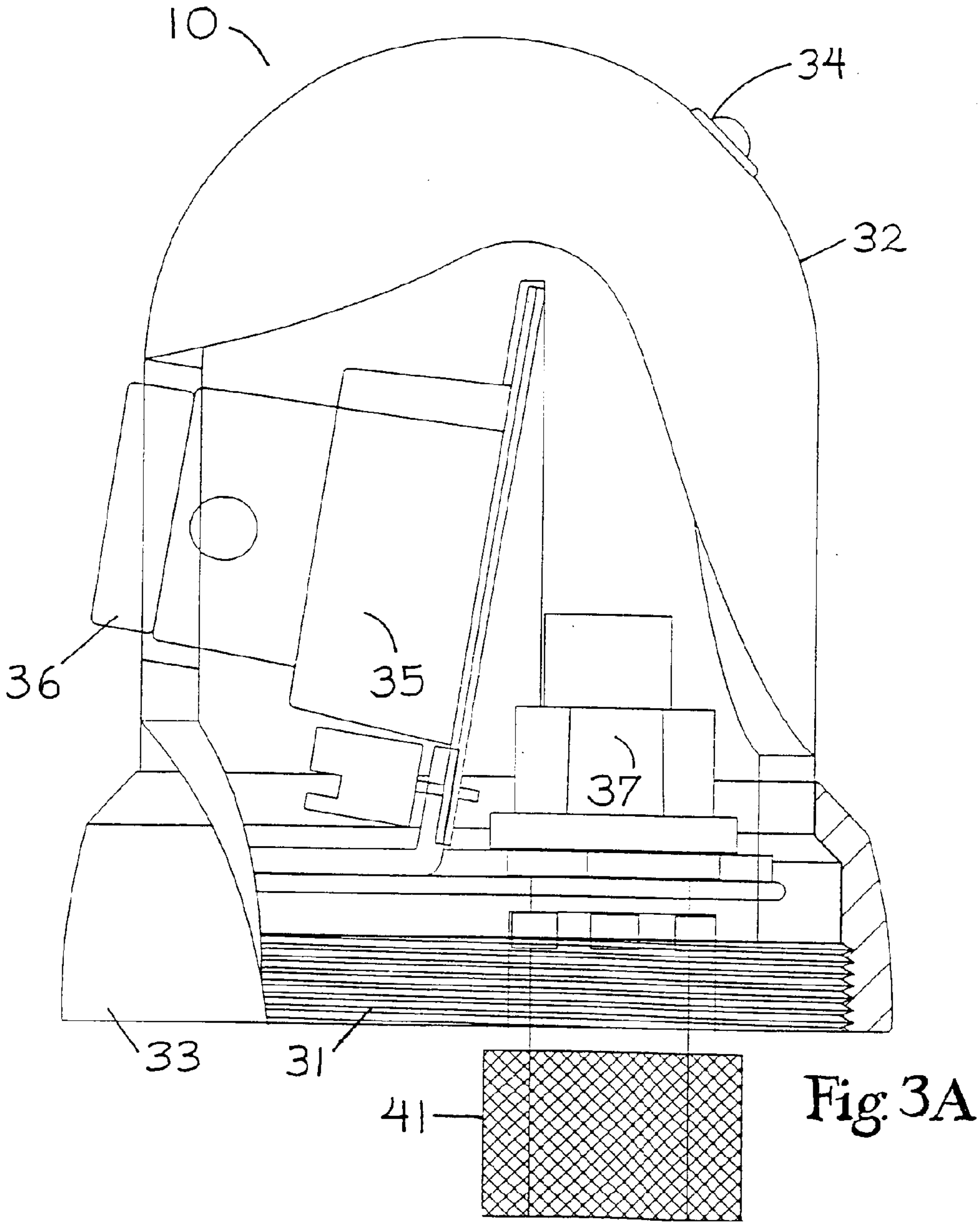
FIG. 3A is an enlarged view of the assembled turret 10 shown in FIG. 3.
Figure 3B:
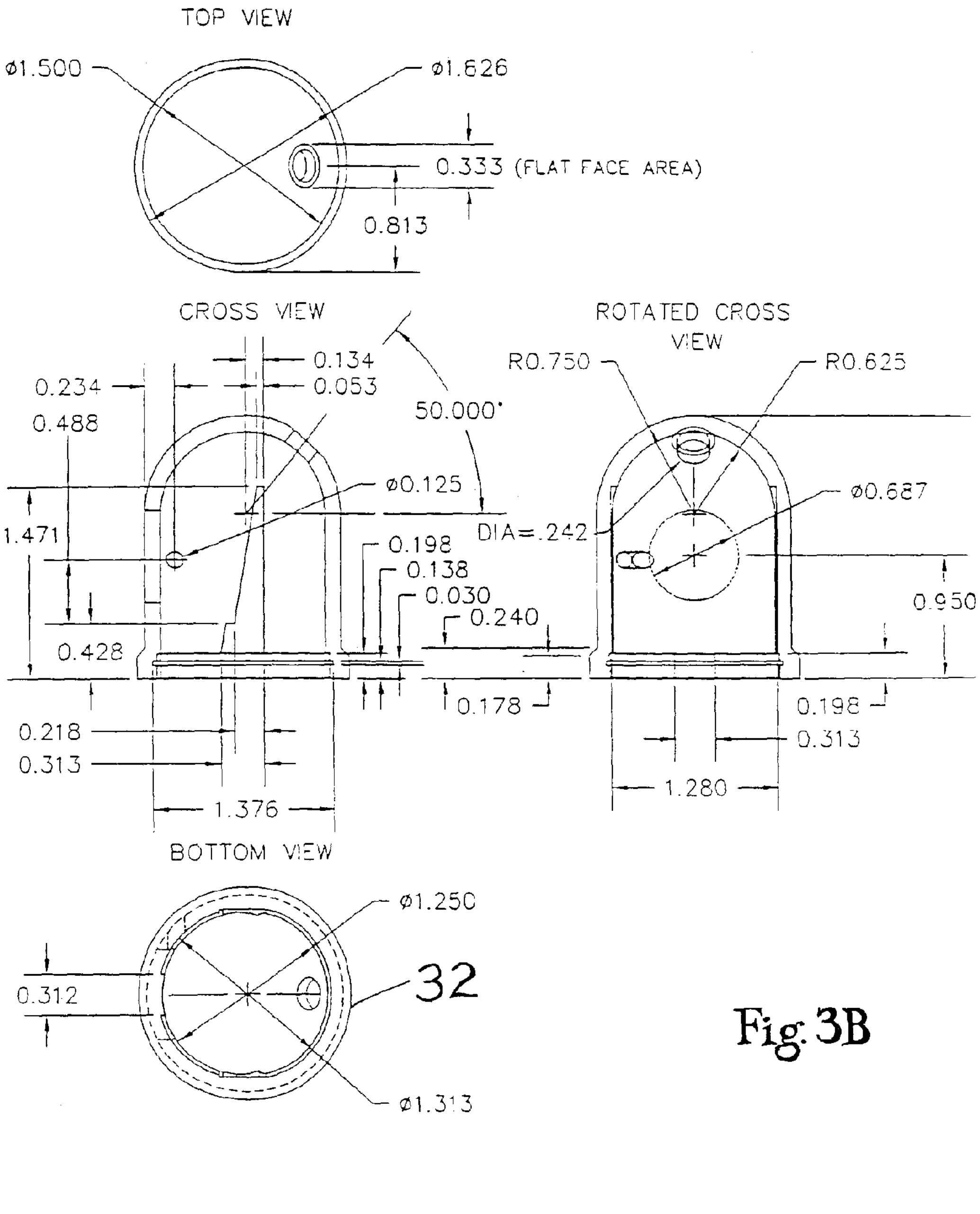
FIGS. 3B to 3F are drawings of turret 10 components shown and described in association with FIG. 3.
Figure 3C:
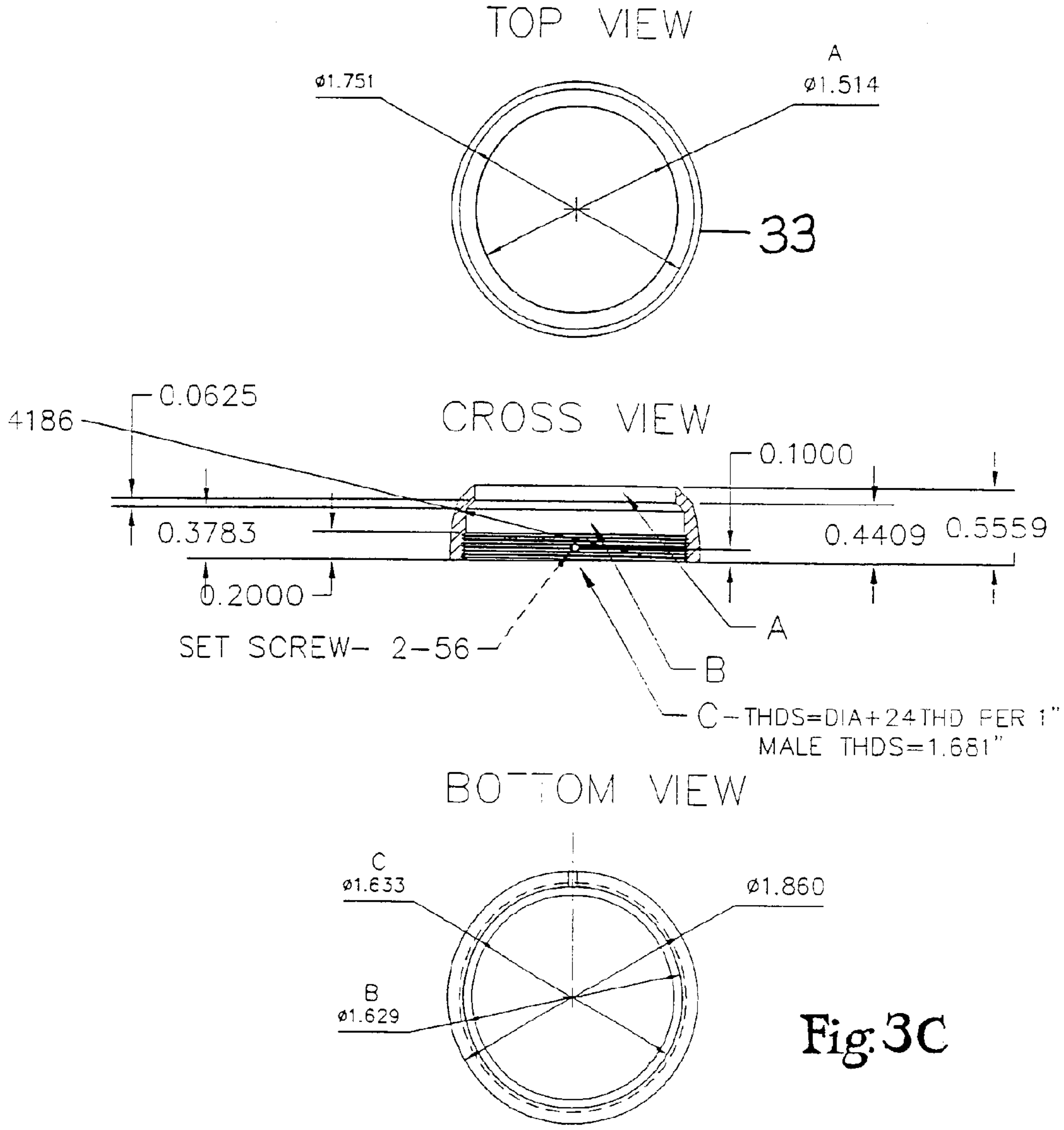
Figure 3D:
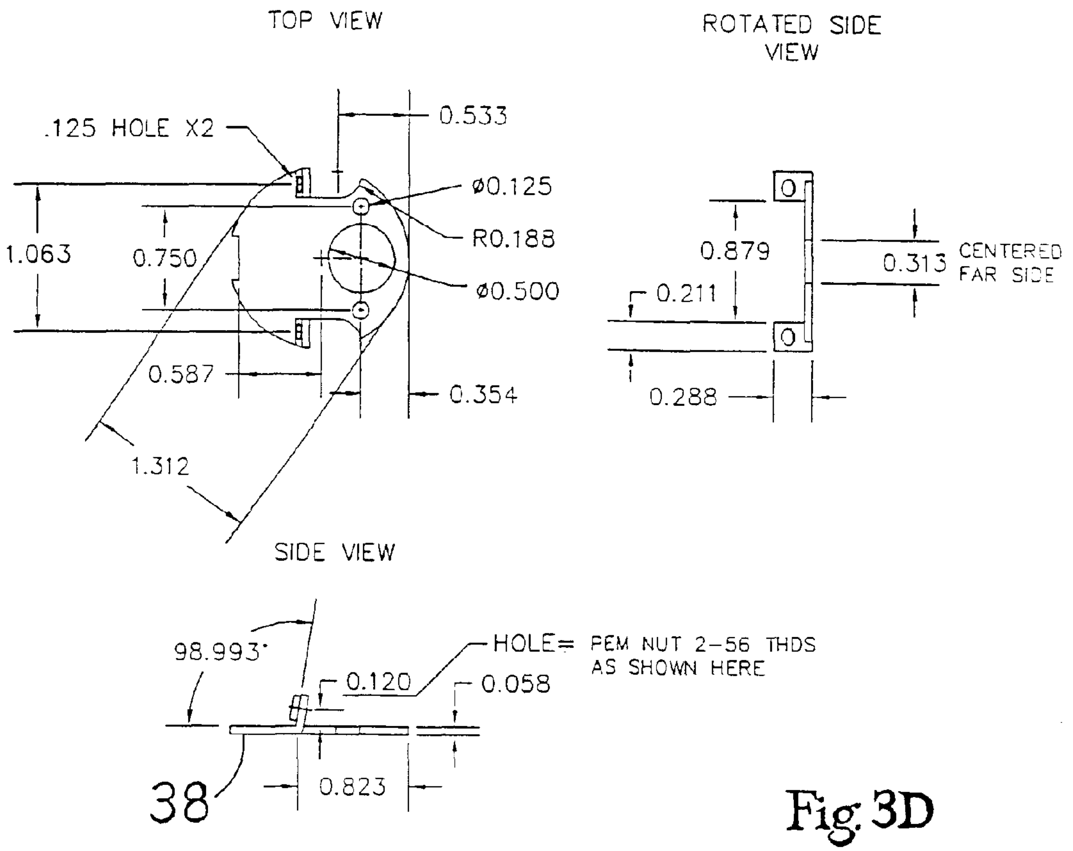
Figure 3E:
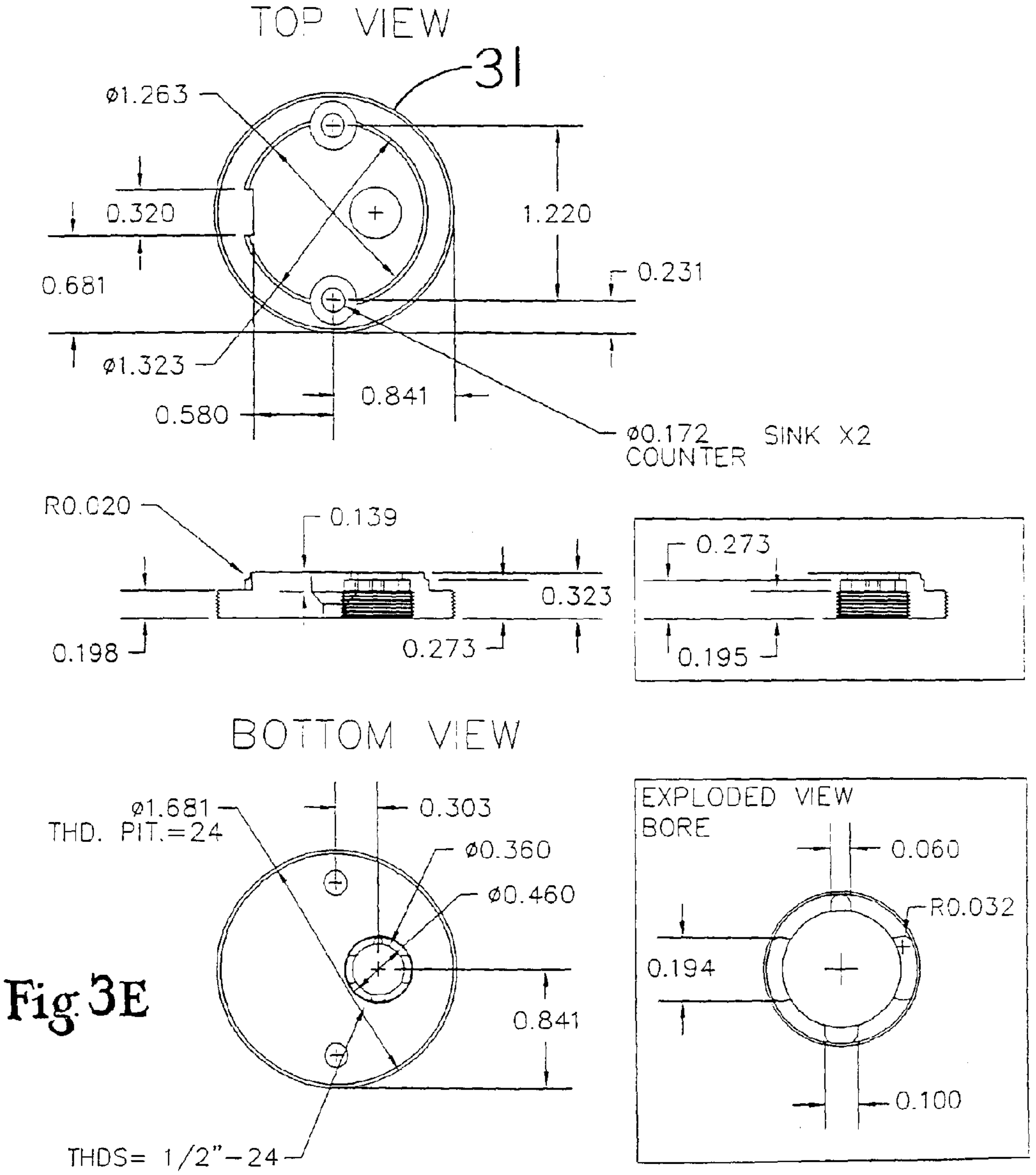
Figure 3F:
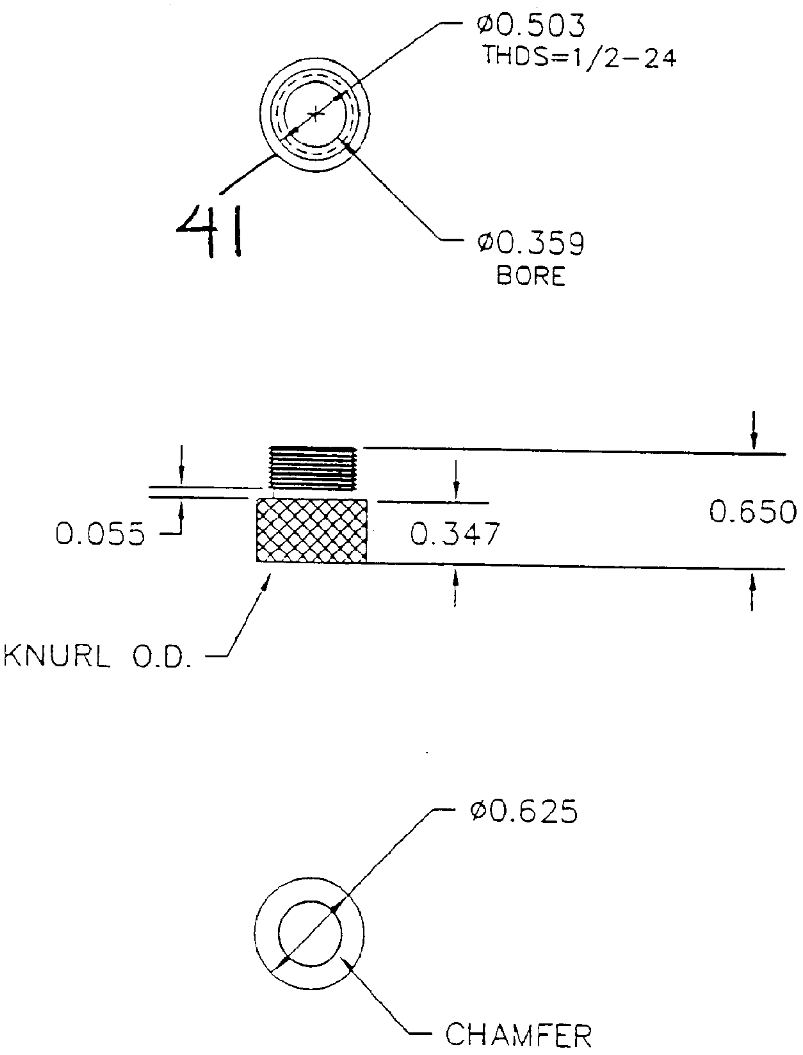
Figure 3G:
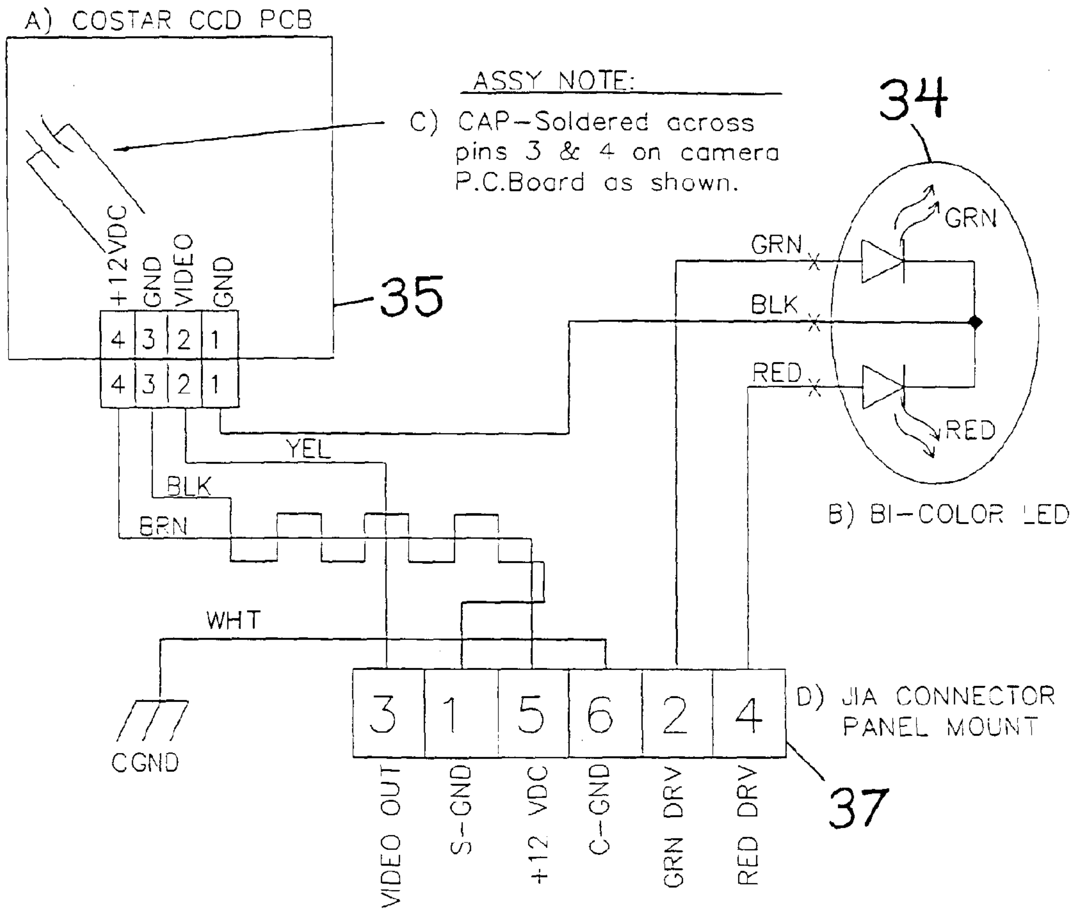
FIG. 3G is a wiring diagram for turret 10 components described in association with FIG. 3.

Referring to FIG. 3, an assembled Comp Light & Chip Reader Turret 10 is shown. A mounting puck base 31 is fastened to the table on top of the felt using screws and two prealigned guide holes in puck 31 to two pre-positioned holes in the table top. Dome shell 32 can be fastened to puck 31 with ring nut clamp 33 which is put in place over the dome before Costar CCD camera 35 and lens 36 are installed in dome 32. A two color LED and retainer 34 are mounted in dome 32. The camera 35, without its lens 36, and a mini din connector 37 are fastened to a chassis plate 38. Camera 35 and LED 34 are wired to the mini din connector 37. Assembled chassis plate 38 is then installed in dome 32 and held in place by retainer ring 39. Lens 36 may then be screwed through the hole in dome 32 into camera 35 (making sure the ring nut clamp 33 is in place near the bottom of the dome 32) and final focus may be performed later and a small allen set screw in the lens holder of camera 35 tightened, through a small hole positioned in the dome, to the lens to hold focus.

Mini din plug 40 is inserted in puck 31 and held in place to the puck by collar screw 41 which screws into puck 31. Puck 31 is then securely screwed through the prealigned guide holes to the table on top of the felt. Connector 37 fastened to chassis plate 38 engages plug 40 held in puck 31 by collar 41 when the assembled dome 32 is appropriately aligned and pushed onto connector 37 of puck 31. Ring nut clamp 33 may then be screwed onto puck 31 holding assembled dome 32 securely in position on puck 31 which is screwed securely to the table on top of the felt.

The wires to plug 40 on puck 31 come up from below the table top through a hole in the table (and through collar screw 41). Plug 40 on puck 31 is easily removable from puck 31 by loosening collar screw 41. This type of arrangement allows the assembled turret 10 to be easily removed from puck 31, and puck 31 easily removed from the table, and plug 40 and collar 41 easily removed from puck 31—this is required in order to replace the felt, which lasts only a few weeks in a busy casino.

Still referring to FIG. 3, to replace the felt, turret 10 is removed and disconnected from puck 31, puck 31 is unscrewed and removed from the table, plug 40 is removed from puck 31 by unscrewing the collar 41 and plug 40 and collar 41 are then temporarily put down through the hole in the table. The old felt is then replaced and a hole cut in the new felt over the hole in the table to let plug 40 and collar 41 come up through the hole. Plug 40 is then screwed to puck 31 by collar 41. Puck 31 is then screwed through its prealigned guide holes on top of the new felt to the table and the turret 10 is remounted to puck 31 and secured by ring nut collar 33.

On top of each turret 10 is the two-color LED 34 (e.g., red and green) called the Comp Light. Each player's comp light 34 lets the player see that his every bet gets credited for comping at the beginning of each hand—the comp light is said to deliver extra gaming satisfaction to the player in this manner.

Comp Light Colors

In a preferred embodiment, the multi-color LED works as follows: No light means no comp card is inserted for that position, and if there is a player at that position, that player is not being rated for comps. Steady yellow or red means that no bet is detected. Blinking red means one or more wagered chips cannot be read—the chip(s) may be the wrong chips, askew, improperly placed or damaged—an adjustment is required.

Blinking green means that all the chip(s) wagered can be read okay. At the start of each hand, which is indicated to the CRS system when the dealer card sensor is covered at the beginning of each hand (as described below), a blinking green LED changes to steady green, to indicate to a player that his bet has been fully credited to his account for comping purposes. In this way, CRS delivers extra gaming satisfaction, a (small) rush of emotion, to the player at the beginning of each new hand. In other embodiments with additional appropriate apparatus, a sound such as a beep, or a message on an individual player display device, etc. may be used instead of or with the steady green, or some combination may be used, to indicate to the player that his bet was read and automatically credited to his comp account and thus deliver to the player extra gaming satisfaction. At the end of the hand, a steady green changes to one of the above colors.

Figure 5:
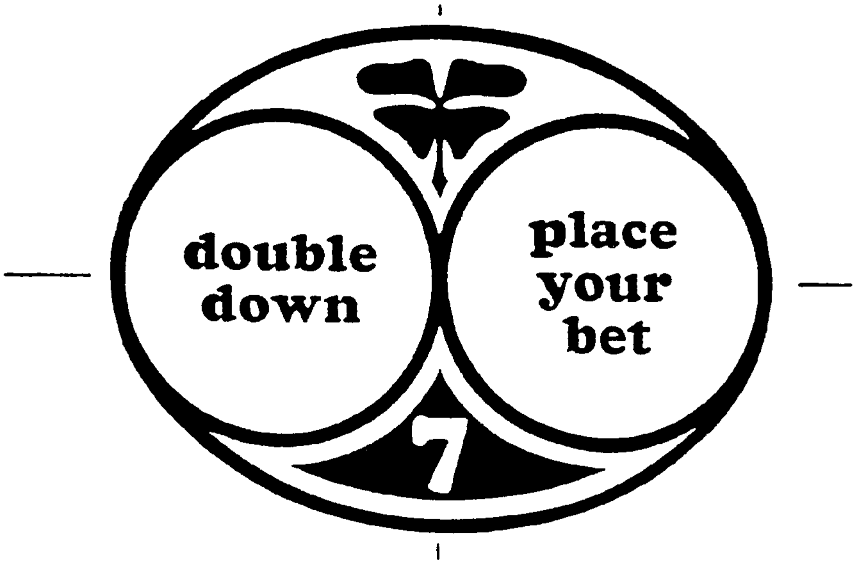
FIG. 5 shows a betting location for a player to place his bets at a blackjack table.

On a typical blackjack table felt layout, each player has an assigned table top location on which to bet. This location is encompassed by a 3 or 4 inch circle or box. In a preferred CRS embodiment, the betting circle or box is replace by two abutting circles which are each a little larger than a casino chip's diameter, about 1.75 inch, and these two circles may be positioned in an oval, as shown in FIG. 5 for the seventh of the seven betting position on a blackjack table. The two abutting circles are approximately equidistant from the player, i.e., horizontally abutting in front of the player. The circle on the right in front of the player is the primary bet circle. The circle on the left is a double down (secondary) bet circle. Double down bets are allowed sometimes—it depends on which cards the player is dealt.

CRS may incorporate a win-loss option: In order to detect when a player has lost a primary bet, a lost bet detection technique may be used. For example, a first light sensitive photocell may be mounted in the middle of the primary bet circle, and a second light sensitive photocell may be mounted one chip's diameter behind the first photocell toward the dealer. If the dealer collects a losing bet, he slides the lost bet toward himself to put the chips in the dealer's chip tray.

In doing this, the first photocell is uncovered to ambient light as the second is covered. When this photocell sequence is detected, the systems records that bet as a losing bet. Bets that are not recorded as a losing bet are recorded as a winning bet. Statistical adjustments are make for pushes (no one wins) and blackjack (which pays 150%). Two additional photocells may be used similarly to detect when a player has lost a secondary bet, or a statistical adjustment may be made.

When a player places a double down bet while his comp light is steady green, the green "winks" off momentarily interrupting the steady green at a slow rate (not to be confused with blinking green), to indicate that the secondary bet has also been credited. If the steady green alternates with a blinking red, an adjustment to the double down bet is required.

To allow color blind players to distinguish blinking red from blinking green, the blink rates described above may differ. The turret may have a raised ridge frame located so that a casino's logo can be neatly placed in the frame on the turret facing the player. This will help foster loyalty from the player toward the host casino that delivers extra CRS gaming satisfaction.

One dealer card sensor, which is not easily seen, is also mounted flat to the table felt in front of the dealer's chip tray, to detect the presence of the first card dealt to the dealer (typically, the dealer's first card is the down card). For example, a light sensitive photocell may be used: Ambient light causes one level of output from the photocell and that level changes when the first dealer's card is dealt to cover the photocell so that ambient light does not reach the photocell.

By detecting the presence of the first card dealt to the dealer, the system then knows that a hand has just been started and is in progress. Once this dealer's card is turned over at the end of the hand and placed on the table but not covering the card sensor and there has been a short delay (the delay is to avoid false indications that the hand is over), the system then knows the hand has just ended, and it is in-between-hands-time, i.e., time to Place Your (next) Bets.

These components are connected by wires through holes in the table to a CRS Multiplex Board mounted to the underside of the table top. This board is connected to a small Table Computer that may be mounted on the inside of a table support leg. More than one such table computers may upload processed play session information to a CRS Server in the pit area, or a CRS table computer may upload directly to the casino's central computer. The server can display all rating information that is in progress on a monitor to Pit Managers, and some information can also be displayed on the individual CRS table terminals. The server may upload complete rating information to the casino's central customer computer.

The key to accurate CRS automatic bet recognition performance is specially coded playing chips. Contrasting color edge spots, like those found on commonly used injection molded casino chips (such as those sold by The Bud Jones Company in Las Vegas), are positioned to form a code word pattern that is repeated around the chip periphery eight times. For each casino, each denomination value is assigned a different code word pattern of edge spots. While the chips can be manufactured similarly to other injection molded casino chips, the self-clocking denomination code word patterns, with error control, are key, and will allow trouble-free and accurate chip identification by the chip reading turret. These code words are described in more detail below.

Overview Description of CRS Operation

A CRS blackjack playing position usually becomes active to rate a player as follows: A player who wants to be rated for comping privileges simply puts his standard-issue comp card on the table when he sits down. The dealer picks up the card and opens a play session for the player by swiping the player's card on the CRS table terminal and inserting it into the comp card holder in the appropriate player position. When the card is inserted, the indicator light on the holder for that position automatically turns on. And, if the player's comp card has been read successfully, the CRS table terminal display may confirm with a good read message and/or beep, and the player's comp light on the player's chip reading turret also turns on to one of the conditions described above (the turret comp light will have previously been turned off, as described below).

When a play session is opened, such as just described, a record is started for an electronic player session rating report on the player. The report may include: name and account number, start time, average bet, high bet, low bet, double down bets, stop time, number of hands played, total amount bet, table number, position played and length of play. Win and loss information, player skill level and illegal play (e.g.: pinching or pressing, i.e., surreptitiously reducing or increasing the bet after the hand has started; or card counting) may also be reported, as described below. Such player information may be processed into a player "rating" for that play session.

If a player's comp card does not work, a pit boss or other employee may enter that player's comp card ID number manually by keying in the required information on the CRS table terminal. If a player who wants to be rated does not have his comp card, a pit boss or other employee may ascertain that player's comp card ID number and enter it manually by keying in the required information on the CRS table terminal.

However, the player without his card can start playing and be rated immediately as follows: before his account number is entered, the dealer hits the UNKNOWN PLAYER key, keys the appropriate player position number(s), 1 to 7, and hits enter, which temporarily identifies that unknown player by the date, time in, pit number, game ID, and/or position number(s) he plays. The unknown player key is also used to manually to enter a player's comp card ID number as soon as it becomes available.

When an unknown player is temporarily identified, or when a player's comp ID number is entered manually before his play starts, the turret comp light turns on to yellow, red, blinking green or blinking red as described above.

If a player wants to be rated, but does not have a comp account with the house, the player can produce some identification so that a new comp account may be started for him, but the above unknown player procedure may be used to start even that player's rated play immediately.

If a player wants to play more than one position, the dealer can use the CRS table terminal as follows: Hit the key for ADDITIONAL PLAYER POSITIONS, key or scroll to the first (primary) betting position number, followed by any additional position numbers the player wants to play, followed by enter, which will activate the appropriate turret(s) and their comp light(s). Multiple positions played by one player can be tracked separately and combined later, or multiple positions played can be combined as the bets occur.

If a player does not want to be rated, that position's comp light will not be lighted, but that position's turret may read that positions' bets anyway, totally automatically, for the purpose of detecting improperly placed bets, pinching, pressing or betting patterns that suggest card counting. CRS may also keep track of the beginning of each new shoe (the playing cards are dealt from the card "shoe"), so that the system can keep track of how many hands have been played from each shoe to aid in detecting card counting, etc. For example, the dealer can key into the CRS table terminal information that a new shoe is starting and/or ended.

The CRS table terminal may also be used to track table productivity, dealers and supervisors by their sign on time, date, pit number, game ID, number of hands, shoes, average bet, total bet, high and low bet, and sign off time, by swiping an employee ID card upon arriving at, and upon leaving, a table or group of tables. A supervisor responsible for a group of tables, for example, can sign in or sign out on any such table if the same type of card as player comp cards are used—different ranges of card ID numbers may be reserved to identify players as well as different levels of employees.

Player buy-in amounts and walk-away amounts, table fills when a dealer runs low on chip tray inventory, and other events can be entered into the system using appropriate keys on the CRS table terminal according to preferred casino procedures.

At the end of a play session, a player's comp card is removed, which informs the system that his play session has ended, and the card is returned to him. If he was playing more than one position, the system will turn off those positions as well. The comp card removal may initiate the uploading of the processed play session rating report information to the server, along with pit number, game ID, date, time in, time out and/or supervisor identification, etc.

An END OF PLAY key on the CRS table terminal can be used to turn off only the additional positions a player is playing if that player at some point plays fewer positions.

At the end of a play session for a player who has no comp card, the dealer hits the END OF PLAY key on the CRS table terminal, followed by the primary position number played by that player and enter, which informs the system that that position's play session has ended. This initiates the uploading of processed play session information to the CRS server. If, for some reason, the player did not have, and was not given, an account number, the system will store the information for that unknown player by the date, time in, time out, pit number, game ID, and position number(s) he played.

However the end of a play session is initiated, the comp light on the turret and the comp card position light in the card holder turn off.

When the dealer's card sensor is covered with the first card dealt to the dealer, the system knows that a hand has started. Then, under control of the CRS table PC (which has a video frame grabber board installed in it), via the CRS Multiplex board, individual images are captured in turn from the CCD devices in the CRS turrets and processed. A monochrome frame grabber board (mounted in a slot in the PC 19 and not shown) is commercially available from Imagenation Corp. of Beaverton, Oreg., model PX 610. The CRS software processes the image and tries to decode a code word for a possible first (bottom) chip in the area of a possible stack of chips in each player's primary bet area. If a first chip's code word is found and decoded, the software then looks for a second code word, and if a second chip's code word is found and decoded, the software then looks for a third code word, and this continues until all code words present are found and decoded, up to a maximum of 24 chips' code words.

On a PC Windows environment on a video monitor in a central area for the pit boss, one window for each CCD device may show 7 respective video images for each player's betting position, and decoded information, such as the amount of the current bet, a running total of bets, the average bet, the number of hands played, etc., may be displayed below each player's window on the monitor. Provision may be made to enlarge a player's window to display more detail (such as a mouse click on the window, or hit the number key on a keyboard for the position to be enlarged, etc.).

In the event one or more chips are detected, but one or more chips, or all of the chips detected, cannot not be successfully decoded, and the condition in not corrected (so as to avoid slowing the game down, for example), a (statistical) estimate of the denomination amount(s) of the unsuccessfully decoded chip(s) may be entered. For example, if the player has only been using $5 chips, undecoded chip(s) may be assumed to be $5 chip(s), or, the running average of the player's bets for that play session, or the average of the player's last three bets, etc., could be entered.

CRS Chip Physical Attributes

Physical attributes of CRS chips in a preferred embodiment are described below. This description anticipates manufacturing the chips by injection molding means. In one embodiment, the two-colored chip CRS requires has 32 rectangular secondary color markings around the chip's periphery edge. The combined width of these 32 rectangular markings total three/eighths of the circumference, allowing five/eighths of the circumference (in 32 segments separating the markings) for the body of the chip (the body of the chip is the primary chip color).

The height of each rectangle is the same, about 0.080 inch (2 mm), and each rectangle is centered on the chip's periphery edge between the two planar surfaces, leaving about 0.025 inch (0.64 mm) above and below the rectangle marking to the edge of the planar surface if the chip height is 0.130 inch (3.30 mm). This means, in effect, that each chip's coding structure has built in bearer bars, as described in applicant's U.S. Pat. No. 5,548,110, column 35. These built in chip bearer bars assist the decoding process by allowing an accurate scan path to be established through a chip's rectangular code element markings.

The minimum width of a rectangular marking and minimum width of a chip body segment separating two rectangular markings is the chip circumference divided by 128, or, 2.8125 degrees (360 degrees/128=2.8125 degrees). If the chip diameter is 1.550 inch (39.37 mm), this minimum width is about 0.038 inch (0.97 mm). This minimum width of 2.8125 degrees is called a module. The width of such markings and segments may be some multiple of this minimum width (some whole number of modules wide).

The chip circumference is equal to 128 modules, each 2.8125 degrees. On a given chip, these 128 modules are comprised of eight (consecutive) repetitions of the same pattern of 16 (consecutive) modules (8×16=128). Each pattern of 16 modules is comprised of 4 rectangular markings separated by 4 body segments, and each such pattern represents one denomination of chip from one particular casino.

A pattern, which is 16 modules wide, is called a code word; a rectangular marking or a body segment is called a code element. A code word is made of eight consecutive code elements (4 rectangular markings separated by 4 body segments). Code elements may be one or more modules wide (1 module=1X). One feature of our coding/decoding scheme is that any eight consecutive code elements of any repeated casino chip code word is 16 modules wide and can be reliably decoded (described below).

CRS chips are either LIGHT primary colored chips with dark (black) rectangular markings, or DARK primary colored chips with light (white) rectangular markings. Examples of light primary chip body colors for Atlantic City (A.C.) include white ($1.00), pink ($2.50), red ($5) and orange ($1000), and examples of dark primary chip body colors include green ($25), black ($100), purple ($500) and gray ($5000).

To increase performance, the (light) color red, for example, should not be a dark red, so that there is maximum contrast with the dark code elements. Dark code elements can be black or another dark color. Likewise, the (dark) color gray, for example, should not be a light gray, so that there is maximum contrast with the light code elements. Light code elements can be white or another light color. The contrast potential of sample pieces of colored material can be measured using CRS reading devices and CRS diagnostic software.

To further increase performance and reduce specula reflection, a matte or dull finish is preferred, not a glossy or shiny finish, on the chip's peripheral surface, which should be cylindrical, allowing a (straight) perpendicular line from the edge of one planar surface to the other.

The code word for an A. C. $5000 dark gray chip is shown below repeated 8 times laid out flat at about actual size. The three narrow light code elements in each repetition of the code word are 1 module each (1X), and the one wide light code element in each code word is 3 modules (3X), for a total of six light code element modules (6/16=three/eighths). The two narrow dark code elements in each repetition of the code word are 1 module each (1X), and the two wide dark code elements in each code word are 4 modules (4X), for a total of ten dark code element modules (10/16=five/eighths).

Another way to show this dark $5000 gray chip code word, shown below, follows, where the four lower module measurements represent the light code elements, and the raised modules represent the dark gray code elements (the first 3X corresponds to the code element with the star above it):

6X light-$3X^{1X}1X^{1X}1X^{4X}1X^{4X\text{-}dark\ 10X}$

The photographic negative image of this $5000 gray chip is used for the A.C. $1000 orange chip as shown below:

10X light-$4X^{1X}4X^{1X}1X^{1X}1X^{3X\text{-}dark\ 6X}$

The red $5 chip code word, shown below, follows, where the four lower module measurements represent the light (red) code elements, and the raised modules represent the dark code elements:

10X light-$4X^{1X}4X^{1X}1X^{3X}1X^{1X\text{-}dark\ 6X}$

The photographic negative image of this $5 red chip is used for the A.C. $100 black chip (not shown).

Figure 1A:
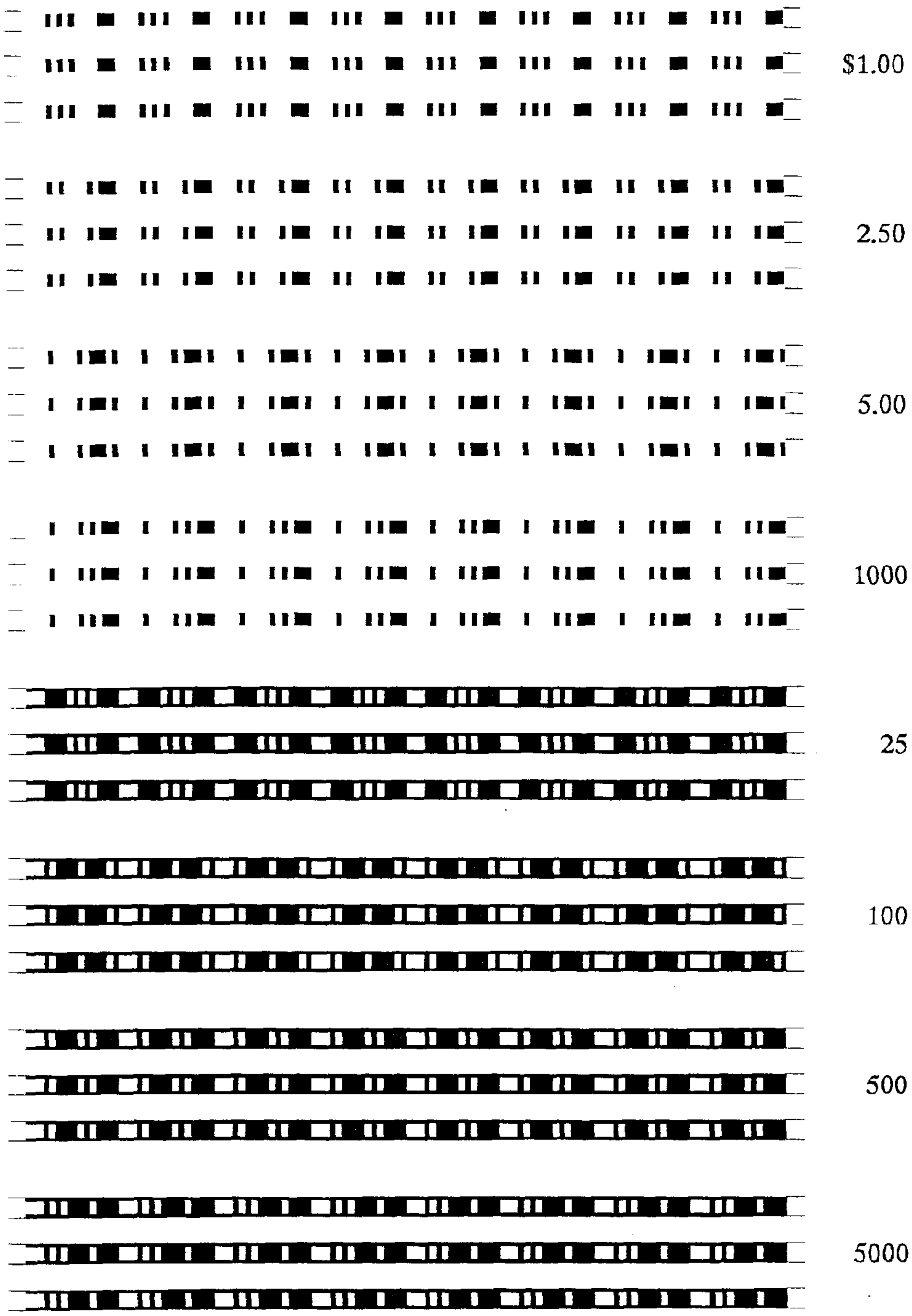
FIG. 1A represents eight distinct casino chip denomination code words repeated eight times along a line.

The code word patterns described above are also shown in the context of a complete set of eight denomination code words in FIG. 1A. FIG. 1A represents eight distinct casino chip denomination code words repeated eight times along a line. Each of the eight is repeated three times. The paper code word strips in these figures were designed and printed so that they could be carefully cut out with an Exacto knife to then be glued around the periphery of an Atlantic City casino chip. This is how the first sample CRS chips were developed.

As mentioned above, eight repetitions of each casino chip denomination code word are shown on each line of FIG. 1A. One dark background code word, for example, has 4 light elements separated by 4 dark background elements as shown below:

This code word is shown with two thin horizontal alignment marks left and right which mark off the height of the chip (about ⅛"). These horizontal alignment marks left and right are also shown in FIG. 1A.

Improved Casino Chip Periphery Code Words

Following the teaching in applicants' related prior applications and with the help of computer aided experimentation, applicant's herein made a decision, in a preferred embodiment, to use sixteen light colored and dark colored uniform modules (bar code parlance) to represent a sequence of sixteen consecutive binary places—one light colored module represents one binary zero (0) and one dark colored module represents one binary one (1). The sixteen module sequence may be repeated a number of times around the periphery of the chip—eight repetitions works well for casino chips. 8 times 16 uniform modules means that there are 128 uniform module widths around a chip's periphery. 360 degrees divided by 128 modules means that each uniform module of space is 2.8125 degrees wide.

This was the foundation for the set of 236 unique casino chip code words described below. This allows a sub-set of eight such code words to be assigned or licensed to each of 29 customer casinos to represent their required eight chip denomination values. The invention and use of these code words requires a coding, programs, methods, means, and a system:

Uniquely Identifiable Reference-Less Valid Numbers

In use, (round) casino chips have no particular rotary orientation and they may be flipped. This means that a repeated code word sequence of light and dark modules evenly surrounding the chip periphery represents a sequence of repeated sixteen binary bit code words that have no binary starting point, and the order of the sequence reverses as chips are flipped over. The code words are repeated in a manner such that each repetition of a code word's end abuts the beginning of another repetition of that same code word. (For applications other than casino chips, code words may not be repeated, but rather are represented only once, but in a manner so that the beginning of one code word abuts its own end.) All that can be initially gleaned from such a sequence is the place value order of the sequence in a forward or reverse direction, but not the place value position of any bit in the sequence, i.e., there is no fixed binary place value assignment to any bit (module) location, just the order of the sequence of bits can be detected in one of two possible directions.

Figure 1B:
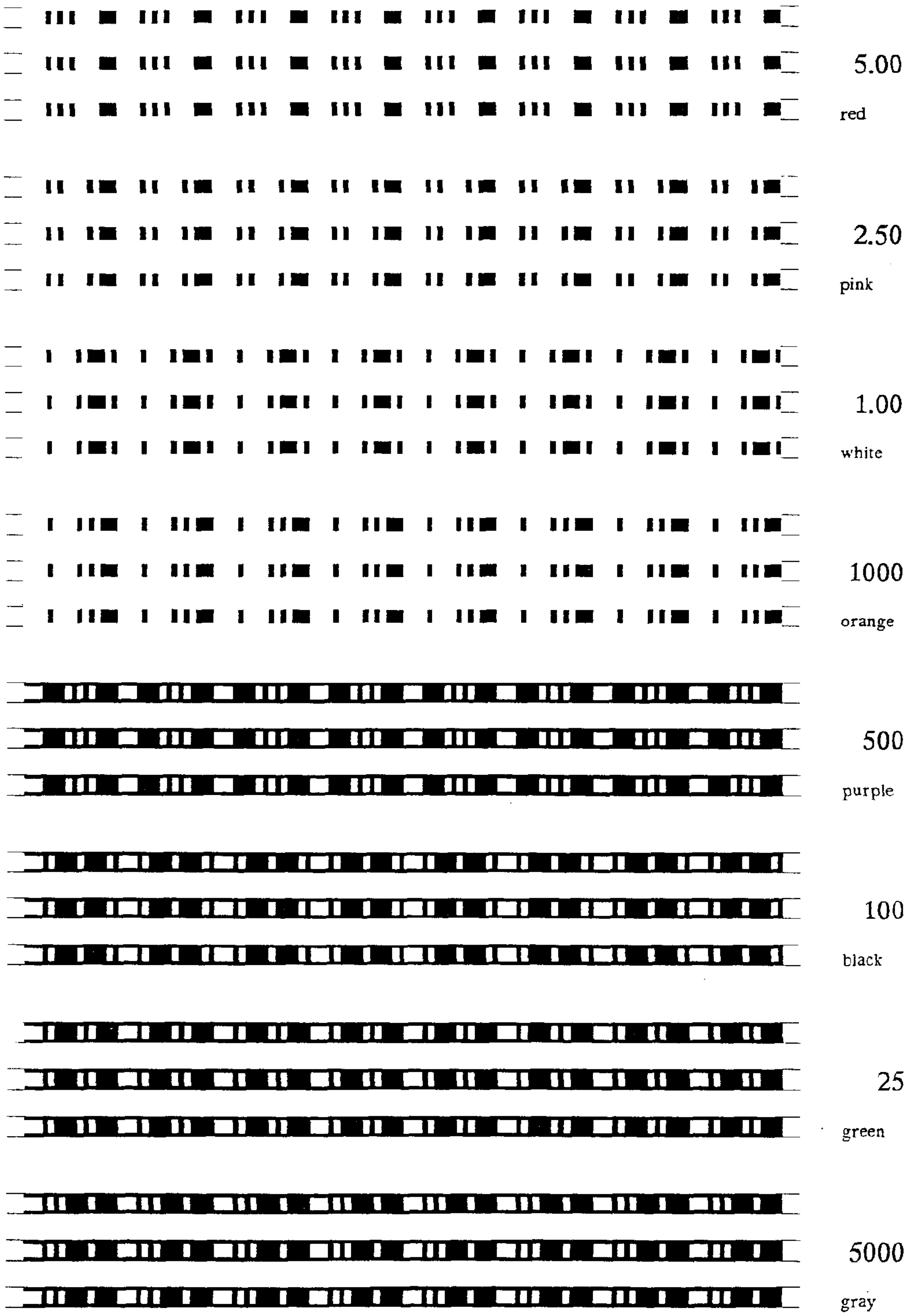
FIG. 1B represents a different assignment of these same code words to denominations.
Figure 2:
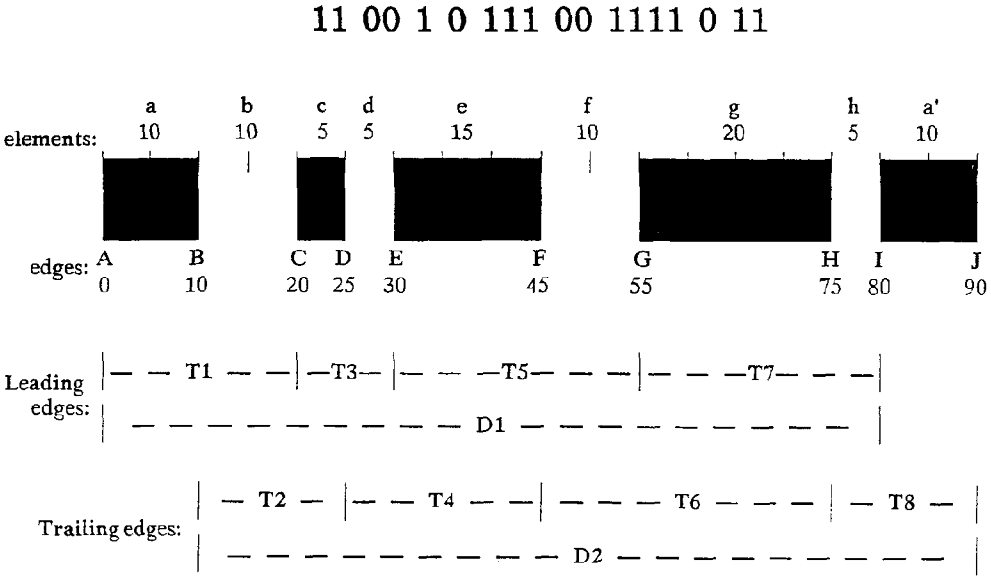
FIG. 2 represents a portion of the periphery of a CRS coded casino chip with edge to similar edge measurements.

Therefore, if chips were numbered in conventional binary notation and used in a casino, some chips would be indistinguishable from others depending on rotation and flipping, as explained starting in column 12 with FIGS. 1-3 in applicants' U.S. Pat. No. 4,814,589. Using the type of program described in '489's FIG. 5, the 2248 valid numbers (not counting all 0s and all 1s) that exist using patent. In the example associated with FIGS. 1-3, there are 13 valid numbers including the all 0s and all 1s valid numbers.)

These 2248 valid numbers require no starting point reference and no directional reference and thus are each uniquely detectable and identifiable no matter their orientation when repeated around a casino chip periphery and decoded by reducing any detected sequence of one complete code word's elements to the lowest possible value by shifting as described in the '589 patent, but we must cull out many candidate code words from these 2248 reference-less valid numbers for various reasons described below:

Self-Clocking—16,4 (n,k) Code Words

While the valid numbers provide uniquely identifiable code words, there remains a need to provide improved means for decoding valid numbers. Applicants' invented a self-clocking (n,k) code word that may be defined as a code word that has a self-contained (inherent) decoding feature that provides efficient means (a reference distance, the longer the distance the better) to determine how many (whole) modules wide each code element of the code word is (or each pair of elements if ink spread is a concern), as described in applicants' U.S. Pat. application filed on Sep. 9, 1994, now U.S. Pat. No. 5,675,137.

A given (n,k) bar code symbology represents a set of alpha and or numeric characters, and each such character is represented by a pattern of k bar elements separated by k space elements, and the k bar and k space elements together total n modules of width. One whole module is the minimum width of a bar or space element. Each bar or space element is one or more (whole) modules wide. In addition to character patterns, distinct start and stop patterns are also required at the beginning and end of the symbol, and quiet zones (a long continues space element) must abut the start and stop patterns to segregate the symbol.

Described in detail below is applicant's self clocking n,k bar code word, without start and stop code and without quiet zones, comprised of n modules and k elements of each of two contrasting bar code properties (bars and spaces), and adjacent to at least one end of said bar code word without space therebetween and extending therefrom are one or more additional elements which repeat the elements(s) from the other end of said bar code word.

A self-clocking code word is one that has an identifiable distance (which may be measured, for example, in timing counts or pixels), and this distance is equal to a known (given) number of modules from one such code word to the next, so that the width of one module, Z, can be accurately ascertained by dividing the measurement of this distance by the (known) number of modules. Z may then be divided into measured individual element widths (or divided into measured pairs of individual element widths), and the result rounded, to determine the module width of each element (or each pair of elements), as described below.

Out of these 2248 code words, applicants then culled out those that do not have exactly four runs of light colored modules (code elements) separated by four runs of dark colored modules (code elements), i.e., applicants used only the 16,4 (n,k) code words of the 2248 valid numbers [(n,k) code words are described in applicants' '137 patent]. This 16,4 feature will make each of the innovative repeated (n,k) code words self-clocking, because, no matter which consecutive eight code elements of the repeated code words are detected (defined by nine consecutive bar code element edges), they will encompass sixteen modules and represent one complete code word.

By comparison, Code 128, discussed in applicants' '137 patent and described elsewhere, for example, is a self-clocking 11,3 (n,k) bar code structure. But in common usage, the 103 different Code 128 code words themselves are not self-clocking. The self-clocking feature of Code 128 arises from the use of additional start/stop patterns which are referenced to quiet zones: once a start or stop pattern is identified next to a quiet zone, then, and only then, does it become known that the next six code elements represent one complete 11,3 code word. Without the start/stop pattern and quiet zone reference, any six consecutive elements within a Code 128 symbol may represent either one complete code word or part of two adjacent code words that are probably different, and it would be difficult or impossible to tell which without the facility of the references described. If six consecutive elements represent part of two adjacent and different code words, then there is no way of knowing exactly how many modules those six elements comprise. Thus, the total number of modules in any six consecutive but unreferenced code elements within a Code 128 symbol is unknown.

But, by repeating the same (n,k) code word as described by applicants around the periphery of a casino chip, a start or stop pattern or a quiet zone, or any external clock or sync pattern of any sort, are not needed for applicants' self-clocking purposes because any eight consecutive elements will be comprised of sixteen modules and represents one complete casino chip code word.

For example, if the 1 st code element of applicants' casino chip code word is not detected first in order, but the eight detected consecutive code word elements start with the 2nd code element, so that a total of eight consecutive elements are read in this order—2nd, 3rd, 4th, 5th, 6th, 7th, 8th, 1st code elements—then these eight code elements must still be comprised of 16 modules because one and only one of each of the eight constituent code elements have been detected in the total of eight consecutive detected code elements.

FIG. 2 illustrates one such code word. FIG. 2 represents a portion of the periphery of a CRS coded casino chip with edge to similar edge measurements. The code word is represented by eight code elements, a to h. Code element a' begins to repeat the same code word, i.e., code element a' repeats code element a.

Decoding Code Elements to Modules

When decoding the code word shown in FIG. 2, for example, the total number of timing counts using a laser scanner (or the total pixel count using a CCD array) of eight consecutive code elements between nine consecutive code element edges, such as the eight elements b, c, d, e, f, g, h and a' between code element edges B, C, D, E, F, G, H, I and J, is divided by 16, giving the average number of such counts per module, Z. To determine how many modules each element is, divide the timing counts of the element by Z and round off. For example, element b: b/Z rounded equals the number of modules wide b is equal to. All eight elements in turn would be decoded by dividing each by Z. The total of all eight elements must equal 16 modules.

The decoded sequence may then be converted to binary bits; still referring to FIG. 2:

element b=2 modules=00 element c=1 modules=1 element d=1 modules=0 element e=3 modules=111 element f=2 modules=00 element g=4 modules=1111 element h=1 modules=0 element a=2 modules=11

The total is 16 modules that form: 0010111001111011.

Thus, eight detected consecutive elements of one of applicants' self-clocking casino chip code words may not be in the right order, but the code elements can readily be decoded to the correct code word by rotating and reversing the order of the elements to the lowest possible value as described in the '589 patent. In this example, 0010111001111011 is the lowest value. This lowest value may then be looked up in a look up table, for example, to determine what the code word represented (denomination value and the casino to which it belongs). This describes one way to decode. Additional decoding techniques are described below in, More Casino Chip Decoding, and other variations are possible using the principles described.

Of the 2248 reference-less valid numbers, 862 are also 16,4 (n,k) code words.

6/10 Color Split—Grade A Parity

While the invention of valid numbers provides uniquely identifiable casino chip code words, and repeated (n,k) bar code structure provides self-clocking code words for decoding purposes, more culling may be applied to provide greater error control.

Decoding error control can be achieved by also culling out code words that don't have a 6/10 color split of modules, i.e., six light 0s and ten dark 1s or ten light 0s and six dark 1s. This provides a form of double parity, and it makes the denomination casino chip code words Grade A as defined in the CIAS book, "Bar Code Analysis, Part IIB", filed with applicants' '137 patent.

"Grade A parity," to coin a phrase, is an improvement over (common) parity because parity can be fooled if two modules of the same color are misread as the opposite color, i.e., two 0s for two 1s, or two 1s for two 0s—grade A parity cannot be fooled if this happens. However, Grade A parity (and common parity) can be fooled if two modules of opposite colors are misread as their respective opposite colors, i.e., a 0 for and 1 and a 1 for a 0. Thus, Grade A parity is more powerful than common parity, especially because two same color modules being misread as the opposite color are more likely than two opposite colors both being misread.

Parity and grade A parity can be also fooled under other conditions, for example, if four modules of the same color are misread as the opposite color, i.e., four 0s for four 1s, or four 1s for four 0s.

Parity provides a minimum Hamming distance of two, and the 6/10 color split upgrades applicants' casino chip code words to a Grade A minimum Hamming distance of two (to coin another phrase), i.e., two opposite errors only.

Of the 862 reference-less valid numbers of the 16,4 (n,k) code word type, 236 have a 6/10 color split. These 236 code words are shown in FIGS. 4A to 4D.

In FIGS. 4A to 4D, each of the 236 code words are shown graphically repeated eight times, followed by their decimal equivalent, followed by their binary equivalent. These 236 code words are quite reliable for use on casino chips, and enough to give each of 29.5 casinos their own set of eight denomination code words.

FIG. 2, described above, illustrates one such code word from this set of 236 code words (decimal 11,899 found in FIG. 4D). The primary dark color code elements, a, c, e and g, measure 2x, 1x, 3x and 4x, subtotaling 10x. The secondary light color code elements, b, d, f and g, measure 2x, 1x, 2x and 1x, subtotaling 6x, for a total of 16 modules.

First Sub Set of Eight Casino Chip Code Words

Of the set of 236 code words described above, eight have more highly desirable modular width qualities than the others do. Of these eight, four are the photographic negative of the other four. Referring now to FIG. 1A, the elements of all eight code words shown have these modular widths: one color's 4 elements always measure 1x, 1x, 1x and 3x (x=a module), subtotaling 6 modules, and the other color's 4 elements always measure 1x, 1x, 4x and 4x, subtotaling 10 modules, for a total of 16 modules per complete code word. Of the set of 236 code words described above, only one sub set of 8 code words has these exact element modular width measurements.

The reason these modular widths are highly desirable is because of the large difference in widths of each respective color, i.e., one color's 4 elements, 1x, 1x, 1x and 3x, are each either 1x wide or two modules greater than 1x, namely 3x wide. When decoding, described elsewhere, it is hard to mistake a 1x width for a 3x width. This might be considered another type of parity.

The other color's 4 elements, 1x, 1x, 4x and 4x, are each either 1x wide or three modules greater than 1x, namely 4x wide. When decoding, it is hard to mistake a 1x width for a 4x width. This might be considered another even stronger type of parity, or disparity if you will.

FIG. 1B shows the same eight code words as shown in FIG. 1A but the denomination values to which these code words have been assigned is different. The code word assignments in FIG. 1B are thought to be easier for casino employees and patrons to memorize, because there is a somewhat logical visual progression of particular code elements of the code words in relation to denomination values on the six lowest value denominations, and that progression stands out to human observation and is therefore easier to remember, to with: one centered single module code element (among other varied code elements) for $1 and $100 chips; two centered single module code elements (among other varied code elements) for $2.50 and $25 chips; and, three centered single module code elements (among other code elements) for $5.00 and $500 chips.

FIGS. 4E to 4H show four other sets of casino chip code words selected from the 236 code words shown in FIGS. 4A to 4D (different from the code words selected for FIGS. 1A and 1B). These four sets of code words have increased error control compared to most other code words of the 236 code words in FIGS. 4A to 4D because within each set of the four sets, FIGS. 4E to 4H, the difference between any of the widths of the same color code elements is at least two modules. For example, all code elements of all four sets of the lesser color, the color that comprises six modules in the aggregate for each code word, are either one module wide or three modules wide. And all code elements of all four sets of the greater color, the color that comprises ten modules in the aggregate for each code word, are at least two modules different from any other code elements (of different width) of that color.

Hamming Distance 4—Double Grade a Parity

In selecting other sub sets of eight code words for other casinos, decoding efforts may be facilitated by culling out code words so that those remaining are separated by a Grade A minimum Hamming distance of four (using the error detecting and correcting "edac" formula), a.k.a. double Grade A parity. Among eight selected code words with double Grade A parity, for there even to be a slim chance of one denomination code word to misread as a different denomination code word, simultaneously four modules must be misread as the opposite color like so: two dark modules must be read as light modules and two light modules must be read as dark modules.

The CIAS Hamming edac formula is described in the CIAS Pat. No. 5,548,110 starting in column 83 and in other CIAS documents.

More Casino Chip Decoding

Applicant's have found that CCD devices in the turret work well for capturing video images to Imagenation Corp. video frame grabber boards incorporated in 166 Mz Pentium PCs. Currently applicant's are using a Costar Video Systems' miniature board camera model CV-7124, and have found Marshall's Electronics V1208 and V1210 also suitable.

Assumptions, definitions and a summary of selected points, which are useful, for the description herein follows: One module measures five pixels wide using the Costar camera. An edge is a change in color from light to dark or dark to light. An element is a run (of modules) of one color. There are 8 consecutive elements in each code word—4 light elements and four dark elements. Each casino chip denomination code word has 16 modules—10 modules of one color and 6 modules of the other color. The same denomination code word is repeated eight times around the casino chip's periphery. Therefore, any 8 consecutive elements contain 16 modules (and the entire periphery has 64 elements, 32 light and 32 dark, which are 128 modules wide).

Referring to FIG. 2, decoding software may proceed as follows to decode any of the 236 code words: Determine if there are at least (A to J) in the general location of the bottom chip of a possible stack of chips in the right-hand chip column bet location. If more than 10 edges are detected, estimate which are the most centrally located 10 edges and work with those 10. For example, which 10 edges are wider (measured in pixels)? The wider 10 edges are more centrally located to the lens.

Still referring to FIG. 2, measure in pixels in the bottom most chip location the distance D1 between the first edge A and the ninth edge I (I−A=D1). Then measure in pixels the distance D2 between the second edge B and the tenth edge J (J−B=D2).

Both measurements should be 16 modules, which is 80 pixels +/−, say, 10%. If not ok, take the same measurements in the location of a possible second chip from the bottom; if not ok, take the same measurements in the location of a possible third chip; if not ok, turn on steady yellow to indicate that no correctly coded chips are present. If at least one but not all chip locations are ok, turn on blinking red to indicate that chips cannot be read. If all ok, measure D1 and D2 for any additional chips that may be present (higher up in the stack) and save all D measurements for later use.

For each chip that satisfies above, tally up pixels for the four elements of each color encompassed by the first measurement, D1. Tally up pixels for the four elements of each color encompassed by the second measurement, D2. The same color from both tallies should be 50 pixels (10 modules times 5 pixels equals 50 pixels) +/−, say, 10%, and the other color from both tallies should be 30 pixels (6 modules times 5 pixels equals 30 pixels) +/−, say, 10%. Check all chip locations that satisfy above. If all not ok, turn on LED to blinking red to indicate that chip(s) cannot be read. If all ok, then continue.

For each chip, check the 30 pixel color; with, say, +/−10% tolerance, two elements should be 5 pixels each (one module each) and two elements should be 10 pixels each, or, three elements should be 5 pixels each (one module each) and one element should be 15 pixels; these are the only combinations possible. If this checks out within tolerance, store for later use the location and width of the central most 5 pixel element (nearest the middle of the approximately 80 pixel D measurement) and assume it is one module wide. This would be element d, one module in width, in FIG. 2.

Still referring to FIG. 2, for each chip, measure element pair measurements T1 through T8 in pixels. Converting each pixel measurement by rounding off to the nearest whole integer is the heart of the decoding process, which calculates leading edges completely separately from trailing edges. This avoids any systematic ink spread concern whatsoever. The integers represent the number of (whole) modules each T measurement encompasses. To convert, calculate as follows (I−A=D1, and, Z=D1/16; and J−B=D2, and, Z2=D2/16):

Leading edges: $(I-A)/16=Z1$ $(C-A)/Z1=T1$ rounded=4 modules $(E-C)/Z1=T3$ rounded=2 modules $(G-E)/Z1=T5$ rounded=5 modules $(I-G)/Z1=T7$ rounded=5 modules Trailing edges: $(J-B)/16=Z2$ $(D-B)/Z2=T2$ rounded=3 modules $(F-D)/Z2=T4$ rounded=4 modules $(H-F)/Z2=T6$ rounded=6 modules $(J-H)/Z2=T8$ rounded=3 modules The eight T measurements will now be reduced by subtraction to the module widths of the nine elements, 11 00 1 0 111 00 1111 0 11 using this convention: one light colored module=0 and one dark colored module=1. Start with the saved one module (light colored) element from above, element d=1 module, and calculate left and right from element d:

$T3=c+d$ $T3-d=c$ 2−1=1 element c=1

$T2=b+c$ $T2-c=b$ 3−1=2 element b=2

$T1=a+b$ $T1-b=z$ 4−2=2 element a=2

The element sequence, a b c, represents 11 00 1 in binary. Continue:

$T4=d+e$ $T4-d=e$ 4−1=3 element e=3

$T5=e+f$ $T5-e=f$ 5−3=2 element f=2

$T6=f+g$ $T6-f=g$ 6−2=4 element g=4

$T7=g+h$ $T7-g=h$ 5−4=1 element h=1

$T8=h+a'$ $T8-h=a'$ 3−1=2 element a'=2

Thus, the nine element sequence, a b c d e f g h a', alternating dark and light elements, 22 11 32 41 2, represents 11 00 1 0 111 00 1111 0 11 in binary notation (1100,1011,1001, 1110 and drop the repeated 11).

Confirm that the first and last element, a and a', are equal. If not, go to blinking red LED. If equal, drop a' and continue to find the valid code word as follows: Rotate in forward direction (shift) 11 00 1 0 111 00 1111 0 to the lowest possible value, 00 1 0 111 00 1111 0 11, and save (forward direction) lowest value (the lowest value is the longest run of zeros followed by the shortest run of ones followed by the longest run of zeros followed by the shortest run of ones etc.). Reverse the order of the bits (because the casino chip may be flipped). Rotate 0 1111 00 111 0 1 00 11 to the lowest possible value 00 11 0 1111 00 111 0 1 and save reverse direction lowest value. Compare lowest forward and lowest reverse values; the lowest value of the two is the valid code word, which is 00 1 0 111 00 1111 0 11, which is:

0010 1110 0111 1011.

Look for the code word 0010 1110 0111 1011 in the table of eight valid code words. If present go green, BINGO. If not, blink the LED red.

In order to limit the peripheral edge reading requirement to 45 degrees, a modified embodiment follows that requires only nine edges encompassing any eight elements be detected, not ten edges. By specification, any eight consecutive elements cover 45 degrees:

For each chip, determine which is the lesser color, i.e., which color has six modules (and not 10 modules). Then, determine if the four elements of the lesser color are 1x, 1x, 1x and 3x, or, 1x, 1x, 2x and 2x (however, only 1x, 1x, 1x and 3x may be used for the first eight denomination codes for the first customer casino). For example, compare the two largest elements of the four lesser color elements; is one (largest) element equal to the other (largest) element, by, say, +/−15%? If yes, the type of combination is 1x, 1x, 2x and 2x; and if no, it is 1x, 1x, 1x and 3x. Once the type of combination is known, assign module widths to these four lesser color elements as follows: if 1x, 1x, 2x and 2x, the two larger elements are 2x each; if 1x, 1x, 1x and 3x, the one largest element is 3x.

Then, for each chip, measure either D1 and T1, T3, T5 and T7 in pixels or measure D2 and T2, T4, T6 and T8 in pixels. Converting each pixel measurement by rounding off to the nearest whole integer is the heart of the decoding process, which calculates either leading edges or trailing edges, but, in this example, not both. This avoids any ink spread concern. The integers represent the number of modules each T measurement encompasses.

Measure Either Leading edges: $(I-A)/16=Z1$ $(C-A)/Z1=T1$ rounded=4 modules $(E-C)/Z1=T3$ rounded=2 modules $(G-E)/Z1=T5$ rounded=5 modules $(I-G)/Z1=T7$ rounded=5 modules Or Measure Trailing edges: $(J-B)/16=Z2$ $(D-B)/Z2=T2$ rounded=3 modules $(F-D)/Z2=T4$ rounded=4 modules $(H-F)/Z2=T6$ rounded=6 modules $(J-H)/Z2=T8$ rounded=3 modules To determine whether to measure leading or trailing edges, test to see which are more centrally located. For example, which is larger, D1 or D2; the larger is more centrally located to the lens.

From above, the module widths of the four elements of the six-module color have been determined and are therefore known. The four T measurements can then be reduced by subtraction to the module widths of the four elements of the ten-module color using this convention: one light colored module=0 and one dark colored module=1. From each of the four T module widths, subtract the known module width of the included six-module color element; the result is the module width of the element of the ten-module color. Thus, the module widths of the eight element sequence, a b c d e f g h, alternating dark and light elements, can be determined.

Replacing Less Serviceable Casino Chips and Currency

As described in Smith's U.S. Pat. No. 3,552,563, there is a need to separate less serviceable currency from more serviceable currency. Smith's invention relied on the fact that worn currency "sags" more than newer currency. Currency or other object with bar coded information would benefit from other techniques to identify the need for repair or replacement.

As described in Maddox's U.S. Pat. No. 5,440,142, there is a need to test bar code scanner window viability to determine whether the window is scratched or otherwise damaged enough to require replacement. For example, the method determines the variance between the widths of bars and spaces to determine if a scanner window needs replacement.

In time, coded casino chips will show signs of wear or become damaged and become unserviceable. One test to determine or help determine or to identify the serviceability of a machine readable casino chip, or whether or not it needs repair or replacement, is to read the bar code on a chip, and if, for any reason, the code cannot be easily or fully read, that chip could be replaced. For example, if one particular light color one module code element on a chip is partially stained or physically damaged so that it appears somewhat wider than one module (measured in pixels or timing counts, for example), the chip could be replaced. In other words, even if a machine reading from a chip is correct, the reading may be somewhat marginal, or the reading may be beyond an acceptable specification, of, say plus or minus 15% of an expected reading, and that could be cause to identify that chip as needing repair or replacement—it would not be efficient or practical to wait until the marginal reading deteriorates further and produces either a no read or worse, an incorrect reading.

The same may be said for paper currency or coins with bar coded information (e.g., serial numbers) and other machine readable objects with bar codes. For example, if a bar coded banknote could be machine read correctly, but somewhat marginally because one or more bar code elements produce a reading beyond an acceptable specification, the banknote could be replaced before it produces a no-read, or worse, a wrong reading; alternatively, if the rest of the banknote is serviceable, a replacement bar code label or the like with that banknote's unique number, or a unique replacement number for that banknote, could be associated with that banknote.

If an object with bar coded information incorporated a bar code with an error correcting feature, e.g., Hamming code, CRC or Reed Solomon, and that error correcting feature was required to get a good reading from the object's bar code, that also might be cause to repair or replace the object or its bar coded information. Further, if the optical contrast, e.g., from ambient light or laser light, between the two contrasting bar code properties on a bar coded object decreases in time beyond an acceptable level, that also might be cause to repair or replace the object or its bar coded information.

The invention claimed is:

1. A system used to indicate at a gaming table whether betting information of a player has been associated with the player at least for player comping purposes based on information including the betting information received from a gaming table which includes a plurality of player betting positions on the table within which one or more chips to be bet can be placed, the system comprising:

a computer which receives the betting information from each betting position relating to a chip or chips at a respective betting position on the gaming table;

an indicator device associated with each betting position on the gaming table viewable from a player side of the table, each indicator device having a plurality of indicating conditions;

the respective indicator device associated with each of the respective betting positions being controlled by the computer based on information received by the computer comprising (a) information indicating that another hand is being played at the table, (b) player identity information associated with a respective betting position or positions and (c) the betting information received by the computer from a respective betting position or positions;

the computer being configured to cause the indicator device associated with a respective betting position to change one of the plurality of indicating conditions thereof to a different one of the plurality of indicating conditions thereof after receiving the information that another hand is being played if the betting information received by the computer from the respective betting position has been associated with a respective player identity at least for player comping purposes.

2. The system of claim 1, wherein the respective indicator device associated with a respective betting position comprises an optical device.

3. The system of claim 1, wherein the respective indicator device associated with a respective betting position comprises an audio device.

4. The system of claim 1, wherein the respective indicator device associated with a respective betting position comprises a display device.

5. The system of claim 1 comprising an input device by which player identity representing a known player or an unknown player can be input to the system for receipt by the computer.

6. The system of claim 5 wherein the input device comprises a magnetic stripe reader.

7. The system of claim 5 wherein the input device comprises a keypad.

8. The system of claim 5 comprising a sensor positioned to detect action occurring at the table indicating that another hand is being played and coupled to provide information relating thereto to the system for receipt by the computer.

9. A method used to indicate at a gaming table whether betting information of a player has been associated with the player at least for player comping purposes identity in an electronic system including a computer, the gaming table which includes a plurality of player betting positions on the table within which one or more chips to be bet can be placed and an indicator device, which has a plurality of indicating conditions, associated with each of the betting positions on the gaming table viewable from a player side of the table, the method comprising:

the computer receiving (a) information indicating that another hand is being played at the table, (b) player identity information associated with a respective betting position or positions and (c) the betting information from a betting position or positions relating to a chip or chips at a respective betting position on the gaming table; and the computer being configured to cause the indicator device associated with a respective betting position to change one of the plurality of indicating conditions thereof to a different one of the plurality of indicating conditions thereof after receiving the information that another hand is being played if the betting information received by the computer from the betting position has been associated with a respective player identity at least for player comping purposes.

* * * * *